(12) United States Patent
Cao et al.

(10) Patent No.: US 12,445,693 B2
(45) Date of Patent: Oct. 14, 2025

(54) DATA TRANSMISSION METHOD AND COMMUNICATION APPARATUS

(71) Applicant: HUAWEI TECHNOLOGIES CO., LTD., Guangdong (CN)

(72) Inventors: Youlong Cao, Shanghai (CN); Shuri Liao, Shanghai (CN); Erkai Chen, Kista (SE); Rui Xu, Shanghai (CN); Shengyue Dou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/389,661

(22) Filed: Dec. 19, 2023

(65) Prior Publication Data

US 2024/0187703 A1 Jun. 6, 2024

Related U.S. Application Data

(63) Continuation of application No. PCT/CN2022/091804, filed on May 9, 2022.

(30) Foreign Application Priority Data

Jun. 23, 2021 (CN) .......................... 202110701156.2

(51) Int. Cl.
*H04N 21/647* (2011.01)
*H04L 41/5009* (2022.01)
(Continued)

(52) U.S. Cl.
CPC ... *H04N 21/64738* (2013.01); *H04L 41/5009* (2013.01); *H04L 65/60* (2013.01); *H04N 21/44209* (2013.01); *H04W 24/02* (2013.01)

(58) Field of Classification Search
CPC . H04L 65/60; H04L 41/5009; H04L 47/2441; H04L 65/80; H04N 21/64738;
(Continued)

(56) References Cited

U.S. PATENT DOCUMENTS 10,805,837 B2 * 10/2020 Szilagyi .............. H04L 41/5025
2013/0286868 A1 10/2013 Oyman et al.
(Continued)

FOREIGN PATENT DOCUMENTS

JP 2007503741 A 2/2007

OTHER PUBLICATIONS

Ericsson:"Analysis of QoE measurements at OAM and RAN." 3GPP TSG-RAN WG3 Meeting #113-e Online, Jan. 25-Feb. 4, 2020. R2-2101273. total 5 pages.

*Primary Examiner* — Sumaiya A Chowdhury

(57) ABSTRACT

A data transmission method and a communication apparatus are provided. The method includes: A network device sends first information to a terminal. The terminal receives the first information, and determines an evaluation mode of user experience based on the first information. The terminal sends second information to the network device. The network device receives the second information, and communicates with the terminal based on the second information. The first information is used to configure the evaluation mode of user experience, the evaluation mode of user experience is one of a plurality of evaluation modes of user experience, the evaluation mode of user experience is used to evaluate impact of network transmission on user experience, and the second information includes information about the impact of the network transmission on user experience.

20 Claims, 7 Drawing Sheets

(51) Int. Cl.
*H04L 65/60* (2022.01)
*H04N 21/442* (2011.01)
*H04W 24/02* (2009.01)

(58) Field of Classification Search
CPC ........ H04N 21/44209; H04N 21/2402; H04W 24/02
See application file for complete search history.

(56) References Cited

U.S. PATENT DOCUMENTS

| | | |
|---|---|---|
| 2013/0326551 A1 | 12/2013 | Chatterjee et al. |
| 2015/0264098 A1* | 9/2015 | Dao .................... H04W 40/08 709/231 |
| 2018/0376362 A1 | 12/2018 | Chen et al. |

* cited by examiner

DATA TRANSMISSION METHOD AND COMMUNICATION APPARATUS

CROSS-REFERENCE TO RELATED APPLICATIONS

This application is a continuation of International Application No. PCT/CN2022/091804, filed on May 9, 2022, which claims priority to Chinese Patent Application No. 202110701156.2, filed on Jun. 23, 2021. The disclosures of the aforementioned applications are hereby incorporated by reference in their entireties.

TECHNICAL FIELD

This application relates to the communication field, and more specifically, to a data transmission method and a communication apparatus.

BACKGROUND

In recent years, with continuous progress and improvement of an extended reality (extended reality, XR) technology, a related industry has developed vigorously. Nowadays, the extended reality technology has been applied to various fields that are closely related to production and life of people, for example, education, entertainment, military affairs, medical care, environmental protection, transportation, and public health. XR is a general term for various reality-related technologies, and specifically includes virtual reality (VR), augmented reality (AR), mixed reality (MR), and the like.

An XR video includes video frames that arrive periodically. A transmission process of the XR video may be as follows: An image frame of the XR video is divided into dozens of internet protocol (IP) data packets at a network transport layer, and the IP data packets are transmitted to a core network. Then, the IP data packets are transmitted to a terminal through a radio access network (RAN). Due to uncertainty of network transmission, there may be problems such as a frame transmission error and a frame transmission delay. This affects user experience.

However, because different terminals measure user experience in different manners, a network device cannot accurately adjust communication behavior based on user experience. Consequently, system efficiency is low, and user experience is poor.

SUMMARY

This application provides a data transmission method and a communication apparatus, to enable a network device to accurately adjust behavior of communication between the network device and a terminal based on user experience fed back by the terminal. This improves user experience.

According to a first aspect, this application provides a data transmission method. The method may be performed by a network device, or may be performed by a component (such as a chip or a chip system) disposed in the network device. Alternatively, the method may be implemented by a logical module or software that can implement all or some functions of the network device. This is not limited in this application.

The method includes: sending first information to a terminal, where the first information is used to configure an evaluation mode of user experience, the evaluation mode of user experience is one of a plurality of evaluation modes of user experience, and the evaluation mode of user experience is used to evaluate impact of network transmission on user experience; receiving second information from the terminal, where the second information includes information about the impact of the network transmission on user experience; and communicating with the terminal based on the second information.

According to the foregoing technical solution, a network device may configure, for the terminal by using the first information, the evaluation mode of user experience used to determine impact of a network transmission status on user experience. In this way, the terminal may obtain information about the impact of the network transmission status on user experience based on the evaluation mode of user experience configured by the network device. The network device configures the evaluation mode of user experience for the terminal. Therefore, a manner for measuring user experience by each terminal is controllable. Thus, the network device may accurately adjust behavior of communication between the network device and the terminal based on impact, fed back by the terminal, of the network transmission on user experience. In this way, system efficiency and user experience are improved.

According to the first aspect, in some possible implementations, the first information is further used to configure a parameter of the evaluation mode of user experience.

In the implementations, the terminal may prestore a plurality of evaluation modes of user experience including to-be-determined parameters.

The network device sends the first information to the terminal, configures, for the terminal, the evaluation mode of user experience including the to-be-determined parameter, and configures a parameter of the evaluation mode of user experience. The network device may configure different parameters for different terminals based on different service requirements of the different terminals, to meet the different requirements of the different terminals and provide good experience for a user.

According to the first aspect, in some possible implementations, the method further includes: sending third information to the terminal, where the third information is used to configure a parameter of the evaluation mode of user experience.

In the implementations, the terminal may alternatively prestore a plurality of evaluation modes of user experience including to-be-determined parameters.

The network device sends the first information to the terminal, configures, for the terminal, the evaluation mode of user experience including the to-be-determined parameter, sends the third information to the terminal, and configures, for the terminal by using the first information, a parameter of the evaluation mode of user experience configured. The network device may configure different parameters for different terminals based on different service requirements of the different terminals, to meet the different requirements of the different terminals and provide good experience for a user.

According to the first aspect, in some possible implementations, the evaluation mode of user experience includes an evaluation mode of image quality experience and an evaluation mode of interactive experience. The evaluation mode of image quality experience is used to evaluate impact of a transmission error on image quality experience. The evaluation mode of interactive experience is used to evaluate impact of a transmission delay on interactive experience.

The impact of the transmission error on image quality experience may be obtained by using an image quality experience mode, and the impact of the transmission delay on interactive experience may be obtained by using an interactive experience mode. When an evaluation score of user experience does not reach a target evaluation score, it may be better determined that the evaluation score of user experience is affected by the transmission error, the transmission delay, or both the transmission error and the transmission delay. The behavior of communication between the network device and the terminal may be adjusted accordingly. This improves user experience.

According to the first aspect, in some possible implementations, the information about the impact of the network transmission on user experience includes evaluation information of image quality experience and evaluation information of interactive experience. The evaluation mode of image quality experience is used to determine the evaluation information of image quality experience. The evaluation mode of interactive experience is used to determine the evaluation information of interactive experience.

The evaluation information of image quality experience indicates a coefficient of the impact of the transmission error on image quality experience or an evaluation score. The evaluation information of interactive experience indicates a coefficient of the impact of the transmission delay on interactive experience or an evaluation score.

The network device may receive the evaluation score of image quality experience fed back by the terminal or the coefficient of the impact of the transmission error on image quality experience fed back by the terminal, and the evaluation score of interactive experience fed back by the terminal or the coefficient of the impact of the transmission delay on interactive experience fed back by the terminal. In this way, when the evaluation score of image quality experience does not reach a target evaluation score of image quality experience, and/or when the evaluation score of interactive experience does not reach a target evaluation score of interactive experience, the behavior of communication between the network device and the terminal may be adjusted accordingly. This improves user experience.

According to the first aspect, in some possible implementations, the information about the impact of the network transmission on user experience indicates an evaluation score of extended reality quality. The evaluation mode of image quality experience and the evaluation mode of interactive experience are used to determine the evaluation score of the extended reality quality.

The network device may receive the evaluation score of the extended reality quality fed back by the terminal. The evaluation score of the extended reality quality may be obtained through combination of the evaluation score of image quality experience obtained by the terminal based on the evaluation mode of image quality experience and the evaluation score of interactive experience obtained by the terminal based on an interactive experience mode. In this way, when the evaluation score of the extended reality quality does not reach a target evaluation score of extended reality quality, the behavior of communication between the network device and the terminal may be adjusted accordingly. This improves user experience.

According to the first aspect, in some possible implementations, the communicating with the terminal based on the second information includes: determining, based on the second information and a channel quality indicator (CQI), a modulation and coding scheme (MCS) used for communication with the terminal; and communicating with the terminal based on the MCS.

The network device may determine a current MCS based on a CQI-MCS mapping relationship, adjust the MCS based on the second information, and communicate with the terminal based on an adjusted MCS. This can provide better experience for the user.

According to a second aspect, this application provides a data transmission method. The method may be performed by a terminal, or may be performed by a component (such as a chip or a chip system) disposed in the terminal. Alternatively, the method may be implemented by a logical module or software that can implement all or some functions of the terminal. This is not limited in this application.

The method includes: receiving first information from a network device; determining an evaluation mode of user experience based on the first information, where the evaluation mode of user experience is one of a plurality of evaluation modes of user experience, and the evaluation mode of user experience is used to evaluate impact of network transmission on user experience; and sending second information to the network device, where the second information includes information about the impact of the network transmission on user experience.

According to the foregoing technical solution, the terminal may receive the first information from the network device, determine the evaluation mode of user experience based on the first information, and send, to the network device, the second information including information about the impact of the network transmission on user experience. In this way, the network device may adjust behavior of communication between the network device and the terminal in a timely manner based on the second information. This improves user experience.

According to the second aspect, in some possible implementations, the method further includes: determining the impact of the network transmission on user experience based on the evaluation mode of user experience.

According to the second aspect, in some possible implementations, the method further includes: determining a parameter of the evaluation mode of user experience based on the first information.

In the implementations, the terminal may prestore a plurality of evaluation modes of user experience including to-be-determined parameters.

The terminal receives the first information from the network device. The terminal determines, based on the first information, the evaluation mode of user experience including the to-be-determined parameter, and a parameter of the evaluation mode of user experience. Different terminals may have different service requirements. Therefore, the different terminals may obtain different parameters, to meet the service requirements of the terminals and provide good experience for the user.

According to the second aspect, in some possible implementations, the method further includes: receiving third information from the network device; and determining a parameter of the evaluation mode of user experience based on the third information.

In the implementations, the terminal may alternatively prestore a plurality of evaluation modes of user experience including to-be-determined parameters.

The terminal receives the first information from the network device. The terminal determines, based on the first information, the evaluation mode of user experience including the to-be-determined parameter. The terminal receives the third information from the network device. The terminal determines, based on the third information, the parameter of the evaluation mode of user experience that includes the to-be-determined parameter and that is determined based on the first information. Different terminals may have different service requirements. Therefore, the different terminals may obtain different parameters, to meet the service requirements of the terminals and provide good experience for the user.

According to the second aspect, in some possible implementations, the method further includes: determining the impact of the network transmission on user experience based on the evaluation mode of user experience and the parameter of the evaluation mode of user experience.

According to the second aspect, in some possible implementations, the evaluation mode of user experience includes an evaluation mode of image quality experience and an evaluation mode of interactive experience. The evaluation mode of image quality experience is used to evaluate impact of a transmission error on image quality experience. The evaluation mode of interactive experience is used to evaluate impact of a transmission delay on interactive experience.

The terminal may obtain the impact of the transmission error on image quality experience by using an image quality experience mode, and obtain the impact of the transmission delay on interactive experience by using an interactive experience mode. When an evaluation score of user experience does not reach a target evaluation score, it may be better determined that the evaluation score of user experience is affected by the transmission error, the transmission delay, or both the transmission error and the transmission delay. In this way, the network device may adjust the behavior of communication between the network device and the terminal accordingly based on the feedback information from the terminal. This improves user experience.

According to the second aspect, in some possible implementations, the information about the impact of the network transmission on user experience includes evaluation information of image quality experience and evaluation information of interactive experience. The method further includes: determining the evaluation information of image quality experience based on the evaluation mode of image quality experience; and determining the evaluation information of interactive experience based on the evaluation mode of interactive experience.

The evaluation information of image quality experience indicates a coefficient of the impact of the transmission error on image quality experience or an evaluation score. The evaluation information of interactive experience indicates a coefficient of the impact of the transmission delay on interactive experience or an evaluation score.

The terminal may feed back, to the network device, the evaluation score of image quality experience or the coefficient of the impact of the transmission error on image quality experience, and the evaluation score of interactive experience or the coefficient of the impact of the transmission delay on interactive experience. In this way, when the evaluation score of image quality experience does not reach a target evaluation score of image quality experience, and/or when the evaluation score of interactive experience does not reach a target evaluation score of interactive experience, the network device may adjust the behavior of communication between the network device and the terminal accordingly. This improves user experience.

According to the second aspect, in some possible implementations, the information about the impact of the network transmission on user experience indicates an evaluation score of extended reality quality. The method further includes: determining the evaluation score of the extended reality quality based on the evaluation mode of image quality experience and the evaluation mode of interactive experience.

The terminal may feed back the evaluation score of the extended reality quality to the network device. The evaluation score of the extended reality quality may be obtained through combination of the evaluation score of image quality experience obtained by the terminal based on the evaluation mode of image quality experience and the evaluation score of interactive experience obtained by the terminal based on an interactive experience mode. In this way, when the evaluation score of the extended reality quality does not reach a target evaluation score of extended reality quality, the behavior of communication between the network device and the terminal may be adjusted accordingly. This improves user experience.

According to the second aspect, in some possible implementations, the method further includes: receiving fourth information from the network device. The fourth information indicates an MCS, and the MCS is related to the second information and a CQI.

The CQI may be reported by the terminal to the network device. In this way, the network device may determine a current MCS based on a CQI-MCS mapping relationship, and adjust the MCS based on the second information. The terminal may receive the fourth information that indicates an adjusted MCS and that is sent by the network device, and communicate with the network device based on the fourth information. This can provide better experience for the user.

According to a third aspect, this application provides a communication apparatus, to implement the method according to any one of the first aspect, the possible implementations of the first aspect, the second aspect, or the possible implementations of the second aspect. The apparatus includes a corresponding unit or module for performing the foregoing method. The unit or module included in the apparatus may be implemented by software and/or hardware. The apparatus may be, for example, a terminal or a network device, may be a chip, a chip system, or a processor that supports the terminal or the network device to implement the foregoing method, or may be a logical module or software that can implement all or some functions of the terminal or the network device.

According to a fourth aspect, this application provides a communication apparatus. The communication apparatus includes a processor. The processor is coupled to a memory, and may be configured to execute a computer program in the memory, to implement the data transmission method according to any one of the first aspect, the second aspect, possible implementations of the first aspect, and the possible implementations of the second aspect.

Optionally, the communication apparatus further includes the memory.

Optionally, the communication apparatus further includes a communication interface, and the processor is coupled to the communication interface.

According to a fifth aspect, this application provides a chip system. The chip system includes at least one processor, configured to support implementations of the functions related to any one of the first aspect, the second aspect, the possible implementations of the first aspect, and the possible implementations of the second aspect, for example, receiving or processing data and/or information related to the foregoing methods.

In a possible design, the chip system further includes a memory, the memory is configured to store program instructions and data, and the memory is located inside or outside the processor.

The chip system may include a chip, or may include a chip and another discrete device.

According to a sixth aspect, this application provides a communication system, including the network device and the terminal.

According to a seventh aspect, this application provides a computer-readable storage medium. The computer storage medium stores a computer program (also referred to as code or instructions). When the computer program is run by a processor, the method according to any one of the first aspect, the second aspect, the possible implementations of the first aspect, and the possible implementations of the second aspect is performed.

According to an eighth aspect, this application provides a computer program product. The computer program product includes a computer program (also referred to as code or instructions). When the computer program is run, the method according to any one of the first aspect, the second aspect, the possible implementations of the first aspect, and the possible implementations of the second aspect is performed.

It should be understood that technical solutions of the third to the eighth aspects of this application are consistent with technical solutions of the first aspect and the second aspect of this application, and advantageous effects achieved by the aspects and the corresponding feasible implementations are similar. Details are not described again.

DESCRIPTION OF EMBODIMENTS

Figure 1:
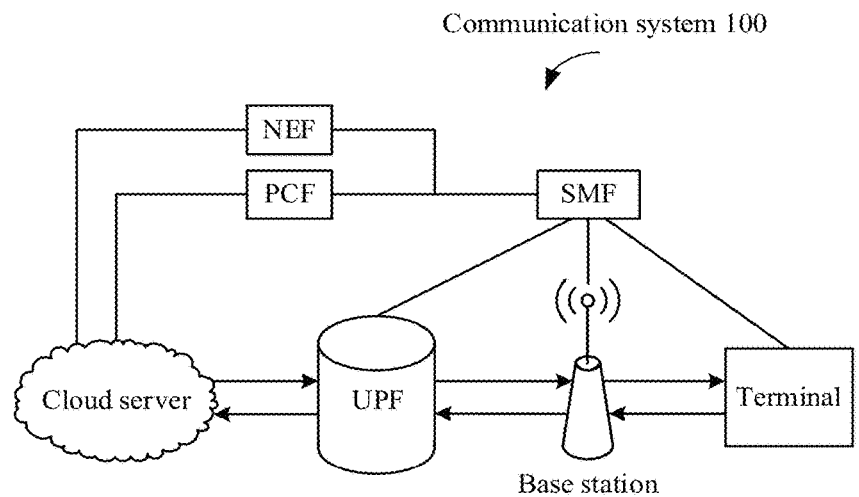
FIG. 1 is a schematic diagram of a communication system applicable to a data transmission method according to an embodiment of this application.

The following describes technical solutions of this application with reference to accompanying drawings.

The technical solutions provided in this application may be applied to various communication systems, for example, a 5th generation (5G) mobile communication system or a new radio access (NR) technology. The 5G mobile communication system may include a non-standalone (NSA) communication system and/or a standalone (SA) communication system.

The technical solutions provided in this application may be further applied to machine type communication (MTC), a machine to machine communication long term evolution technology (long term evolution-machine, LTE-M), a device-to-device (D2D) network, a machine-to-machine (machine-to-machine, M2M) network, an internet of things (IoT) network, or another network. The IoT network may include, for example, an internet of vehicles. Communication modes in an internet of vehicles system are collectively referred to as a vehicle to X (that is, V2X, where X may represent everything) system. For example, the V2X may include vehicle to vehicle (V2V) communication, vehicle to infrastructure (V2I) communication, vehicle to pedestrian (V2P) communication, or vehicle to network (V2N) communication.

The technical solutions provided in this application may be further applied to a future communication system, for example, a sixth generation mobile communication system. This is not limited in this application.

In embodiments of this application, a network device may include all devices with a network transmission function, such as a radio access network device or a core network device. The following describes the network device in detail with reference to scenarios shown in FIG. 1 and FIG. 2. Details are not described herein.

The radio access network device may be any device with a wireless transceiver function. The radio access network device includes but is not limited to: an evolved NodeB (eNB), a NodeB (NB), a radio network controller (RNC), a base station controller (BSC), a base transceiver station (base transceiver station, BTS), a home NodeB (for example, a home evolved NodeB, or a home NodeB, HNB), a baseband unit (BBU), an access point (AP) in a wireless network system, a radio relay node (RRN), a wireless backhaul node, a transmission point (TP), or a transmission and reception point (TRP). Alternatively, the radio access network device may be a gNB or a transmission point (TRP or TP) in a 5G system, such as an NR system, or one antenna panel or a group of antenna panels (including a plurality of antenna panels) of a base station in a 5G system, or may be a network node that constitutes the gNB or the transmission point, for example, a baseband unit (BBU), or a distributed unit (DU). It may be understood that all or some functions of the radio access network device in this application may alternatively be implemented by using a software function running on hardware, or may be implemented by using an instantiated virtualization function on a platform (for example, a cloud platform).

The base station may be a macro base station, a micro base station, a picocell base station, a small cell, a relay station, a balloon station, or the like. If there are a plurality of network devices in the communication system, the plurality of network devices may be base stations of a same type, or may be base stations of different types. The plurality of base stations may support networks of a same technology mentioned above, or may support networks of different technologies mentioned above. The base station may communicate with a terminal, or may communicate with the terminal through a relay station. Alternatively, the network device may be a radio controller, a central unit, and/or a distributed unit in a radio access network communication system. The core network device may include a user plane (user plane function, UPF) network element. The UPF is a data plane gateway, and may be used for packet routing and forwarding, quality of service (QOS) handling of user plane data, or the like. User data may be accessed to a network by using the network element. In embodiments of this application, a core network device configured to perform functions of the following network device may be, for example, the UPF or another network element with a function the same as or similar to that of the UPF.

The core network device may further include another function network element of a core network, for example, a network element such as a network exposure function (NEF) network element, a session management function (SMF) network element, or a policy control function (PCF) network element. The NEF is configured to securely open up, to the outside, a service, a capability, and the like that are provided by a 3GPP network function. The SMF is mainly configured to perform session management, terminal IP address allocation and management, selection and control of a user plane function, termination of interfaces towards policy control or charging function, downlink data notification, and the like. The PCF may be configured to provide a unified policy framework for governing network behavior, and provide information such as policy rules for a control plane function (such as the SMF).

Alternatively, the network device may be a cloud server or the like. This is not limited in this application.

In this embodiment of this application, the terminal may be a device with a wireless transceiver function. The terminal may be deployed on land, including an indoor, outdoor, handheld, wearable, or vehicle-mounted device, or the terminal may be deployed on a water surface (for example, on a ship). Alternatively, the terminal may be deployed in the air (for example, on a plane, a balloon, or a satellite). The terminal may be a device that provides voice/data connectivity for a user, for example, a handheld device or vehicle-mounted device with a wireless connectivity function. Currently, some examples of the terminal may be: a mobile phone, a tablet computer (pad), a computer with a wireless transceiver function (such as a notebook computer or a palmtop computer), a mobile internet device (MID), a virtual reality (VR) device, an augmented reality (AR) device, a wireless terminal in industrial control, a vehicle-mounted terminal, a wireless terminal in self driving (self driving), a wireless terminal in telemedicine (remote medical), a wireless terminal in a smart grid (smart grid), a wireless terminal in transportation safety, a wireless terminal in a smart city, a wireless terminal in a smart home, a cellular phone, a cordless phone, a session initiation protocol (session initiation protocol, SIP) phone, a wireless local loop (WLL) station, a personal digital assistant (PDA), a handheld device or computing device with a wireless communication function or another processing device, vehicle-mounted device, or wearable device connected to a wireless modem, a terminal in a 5G network, or a terminal in a future evolved public land mobile network (PLMN).

The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is more than a hardware device, and is used to implement a powerful function through software support, data exchange, and cloud interaction. In a broad sense, wearable intelligent devices include full-featured and large-sized devices that can implement complete or partial functions without depending on smartphones, such as smart watches or smart glasses, and devices that are dedicated to only one type of application function and need to work with other devices such as smartphones, such as various smart bands or smart jewelry for monitoring physical signs.

The terminal may also be referred to as a terminal device, user equipment (user equipment, UE), an access terminal device, a subscriber unit, a subscriber station, a mobile station, a remote station, a remote terminal, a mobile device, a user terminal, a wireless communication device, a user agent, or a user apparatus. The terminal may be fixed or movable.

The terminal may communicate with different network devices. The terminal may communicate with a plurality of base stations using different technologies. For example, the terminal may communicate with a base station supporting an LTE network, may communicate with a base station supporting a 5G network, or may support dual connections to a base station in an LTE network and a base station in a 5G network.

It should be understood that specific forms of the network device and the terminal are not limited in this application.

Figure 2:
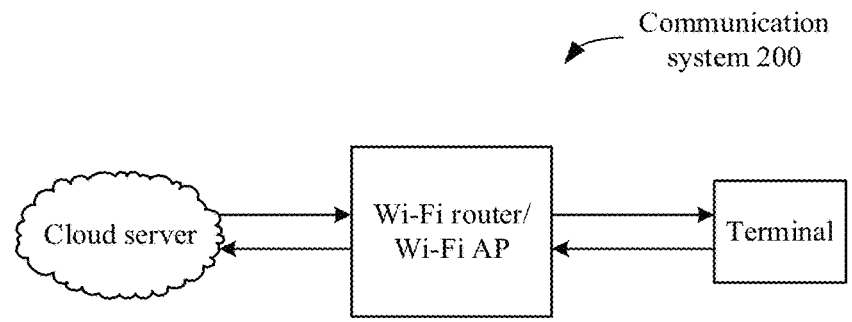
FIG. 2 is another schematic diagram of a communication system applicable to a data transmission method according to an embodiment of this application.

For ease of understanding, the following briefly describes, with reference to FIG. 1 and FIG. 2, a communication system applicable to a data transmission method according to an embodiment of this application.

FIG. 1 is a schematic diagram of a communication system 100 applicable to a data transmission method according to an embodiment of this application. As shown in FIG. 1, the communication system 100 includes a cloud server, a UPF, a base station, a terminal, and network elements such as an NEF, an SMF, and a PCF. The cloud server may perform decoding, rendering, and the like on a video source. The terminal may be a device such as head-up display XR glasses, a video player, or a holographic projector.

In the foregoing communication system 100, data, instructions, or a signal may be transmitted by the cloud server to the UPF. The UPF may transmit the data, signaling, the instructions, or the signal to the terminal by using the base station. After receiving the data, the signaling, the instructions, or the signal, the terminal may feed back some data or information to the UPF by using the base station. The UPF then transmits the data or information to the cloud server.

It should be understood that in the communication system 100, the cloud server, the UPF, the base station, or the like may have the functions of the network device in this embodiment of this application. For example, in the communication system 100, the cloud server has the functions of the network device in this embodiment of this application. In this case, first information, third information, or fourth information sent by the cloud server may be forwarded to the terminal in a network transmission process by an intermediate network element such as the UPF and the base station. For another example, in the communication system 100, the base station has the functions of the network device in this embodiment of this application. In this case, first information, third information, or fourth information sent by the base station may be directly sent to the terminal. The following describes the first information, the third information, or the fourth information in detail. Details are not described herein. It should be further understood that in the communication system 100, specific forms of the network device and the terminal are not limited. The communication system 100 and the foregoing data transmission process are merely examples, and shall not constitute any limitation on this application.

FIG. 2 is a schematic diagram of a communication system 200 applicable to a data transmission method according to an embodiment of this application. As shown in FIG. 2, the communication system 200 includes a cloud server, a terminal, and a wireless fidelity (Wi-Fi) router or a Wi-Fi AP.

In the foregoing communication system 200, the cloud server may send data, signaling, instructions, or information to a radio access network device such as the Wi-Fi router or the Wi-Fi AP. Then, the radio access network device sends the data, the signaling, the instructions, or the information to the terminal. After receiving the data, the signaling, the instructions, or the information, the terminal may send some feedback data or information to the wireless network device. Then, the wireless network device may send the feedback data or information to the cloud server. For example, the cloud server may transmit XR media data or a common video to an XR terminal by using the Wi-Fi router, the Wi-Fi AP, or the like. The XR terminal may alternatively send feedback information to the cloud server through the same path.

It should be understood that in the communication system 200, the cloud server, the Wi-Fi router, or the Wi-Fi AP has the functions of the network device in this embodiment of this application. For example, the cloud server has the functions of the network device in this embodiment of this application. In this case, first information, third information, or fourth information sent by the cloud server may be forwarded to the terminal by using the Wi-Fi router or the Wi-Fi AP. For another example, the Wi-Fi router or the Wi-Fi AP has the functions of the network device in this embodiment of this application. In this case, first information, third information, or fourth information sent by the Wi-Fi router or the Wi-Fi AP may be directly sent to the terminal. The following describes the first information, the third information, or the fourth information in detail. Details are not described herein. It should be further understood that in the communication system 200, specific forms of the network device and the terminal are not limited. The communication system 200 and the foregoing data transmission process are merely examples, and shall not constitute any limitation on this application.

Figure 3:
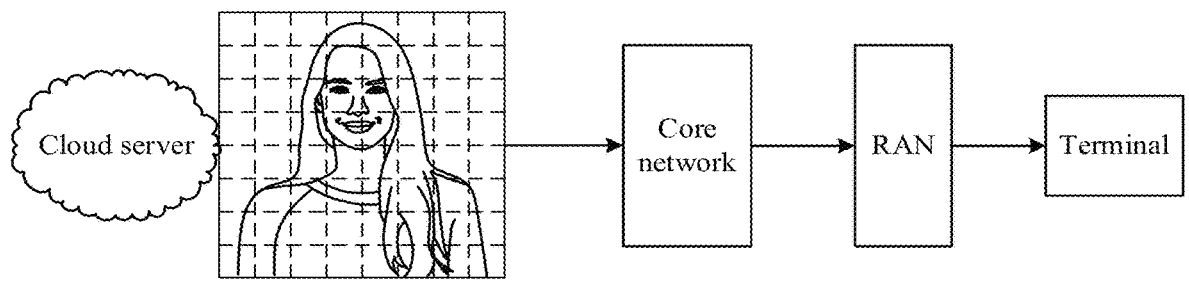
FIG. 3 is a schematic diagram of XR video transmission.

FIG. 3 is a schematic diagram of XR video transmission. The XR video transmission shown in FIG. 3 may be a schematic diagram of transmission in, for example, the communication system 100 shown in FIG. 1. The XR video may include a plurality of video frames. The XR video may be sent by, for example, the cloud server in FIG. 1. In other words, the cloud server may be a transmitting end of the XR video. Correspondingly, a receiving end of the XR video may be the terminal in FIG. 1. In FIG. 3, an image frame of the XR video may be divided into dozens of IP data packets at a network transport layer of the transmitting end, and the data packets are transmitted to a core network. Then, the IP data packets are transmitted to the receiving end through a RAN. It should be understood that the XR video transmission process shown in FIG. 3 is merely an example, and shall not constitute any limitation on this application.

Due to uncertainty of network transmission, there may be problems such as a frame transmission error or a frame transmission delay. This affects user experience. However, because different terminals measure user experience in different manners, a network device cannot accurately adjust communication behavior based on user experience. Consequently, system efficiency is low, and user experience is poor.

Therefore, this application provides the data transmission method. The network device may configure, for the terminal by using the first information, the evaluation mode of user experience used to determine impact of a network transmission status on user experience. The terminal may obtain information about the impact of the network transmission status on user experience based on the evaluation mode of user experience configured by the network device. In this way, the network device may accurately adjust the behavior of communication between the network device and the terminal based on user experience fed back by the terminal. This improves user experience.

To better understand the data transmission method provided in embodiments of this application, terms in this application are first briefly described.

1. Frame transmission error: may also be referred to as a frame error, and is an error occurs during frame transmission. If an error occurs in a data packet included in the video frames during transmission, the image frame cannot be correctly decoded as a whole.

2. Frame transmission delay: is a delay that occurs during frame transmission. For example, arrival time of the first packet of each frame is denoted as t1 and arrival time of the last packet is denoted as t2. In this case, T=t2−t1 may be used to measure a delay of the frame during transmission on a network side. If the delay exceeds a sum of a maximum frame delay budget (FDB) of the frame and a delay of a terminal buffering capability, frame skipping occurs. In other words, a frame at a given reference location fails to arrive.

Figure 4:
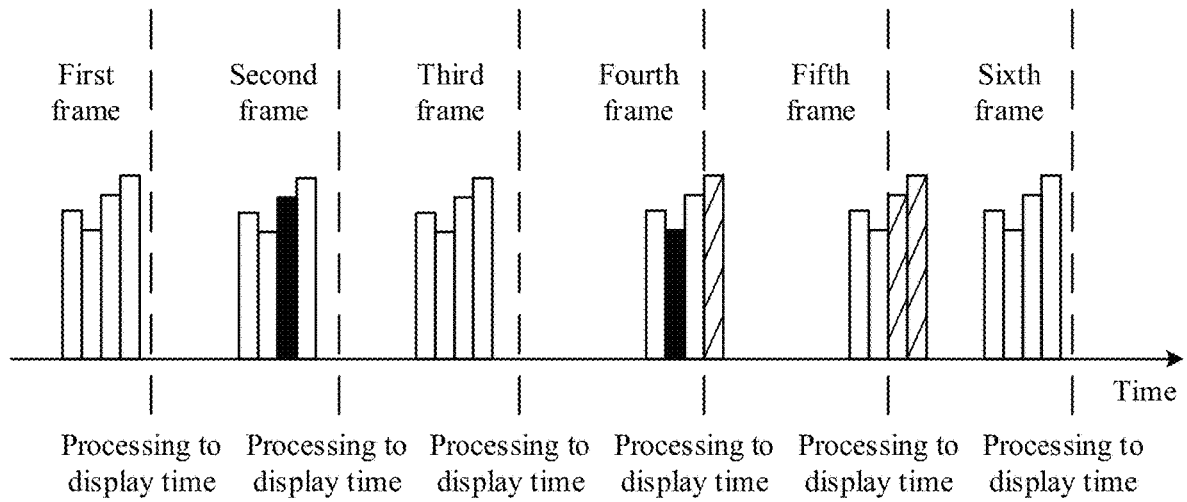
FIG. 4 is a schematic diagram of a frame transmission process.

FIG. 4 is a schematic diagram of a frame transmission process. FIG. 4 shows arrival situations of six video frames. Each video frame may include a plurality of IP data packets, and each rectangular box in the figure may represent one IP data packet. It can be learned from the figure that a transmission error occurs in an IP data packet of a second frame. Consequently, the second frame has the transmission error. A transmission error occurs in an IP data packet of a fourth frame. Consequently, the fourth frame has the transmission error. In addition, IP data packets of the fourth frame do not arrive at processing to display time. Consequently, transmission of the fourth frame is delayed. Similarly, IP data packets of a fifth frame do not arrive at processing to display time. Consequently, transmission of the fifth frame is delayed.

3. Mean opinion score (MOS): is a commonly accepted subjective measurement method for voice and video quality. The MOS may be used to obtain a real auditory/visual quality score.

Figure 5:
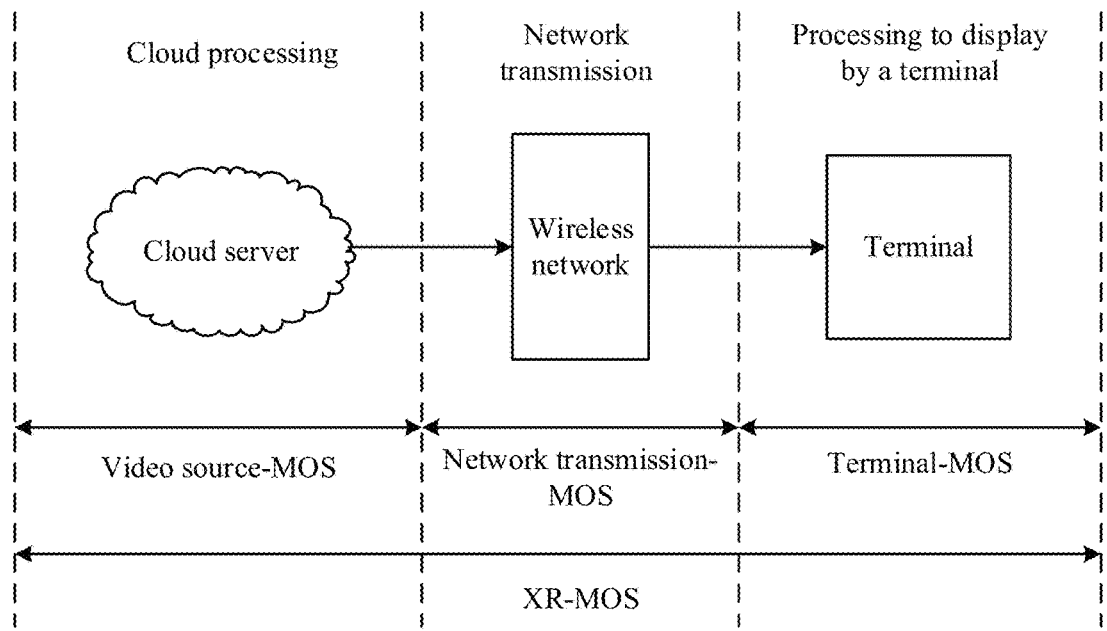
FIG. 5 is schematic decomposition map of an XR-mean opinion score (mean opinion score, MOS)

FIG. 5 is schematic decomposition map of an XR-MOS. As shown in FIG. 5, the XR-MOS may be obtained from three perspectives: a video source, network transmission, and a terminal. The network transmission may include two parts: access network transmission and core network transmission.

In a possible implementation, the XR-MOS may be obtained through a simplest linear superposition on three parts: a video source-MOS, a network transmission-MOS, and a terminal-MOS. For example, XR-MOS=video source-MOS+network transmission-MOS+terminal-MOS.

The cloud server may define the video source-MOS. Factors affecting the video source-MOS include: image quality, a frame rate, resolution, audio quality, and the like. The network device may define the network transmission- MOS. Factors affecting the network transmission-MOS include: a transmission capability on the network side, a delay budget (packet delay budget, PDB), a packet error rate (PER), and the like. The terminal may define the terminal-MOS. Factors affecting the terminal-MOS include: a field of view (FOV) supported by the terminal, a terminal refresh rate, a battery life, wear comfort, a buffering capability, and the like.

It should be understood that the schematic decomposition map of the XR-MOS shown in FIG. 5 is merely an example, and shall not constitute any limitation on this application.

4. Evaluation score of extended reality quality: may also be referred to as an extended reality quality index (XQI). The XQI is provided in this application for evaluating the impact of the network transmission on user experience. A basic principle of the evaluation score of the extended reality quality is that, at the network transmission side, statistical data and a signal source, and/or related information at a terminal side that may be obtained during the network transmission are used as much as possible to approximate a subjective experience evaluation of the user on an XR service. In other words, the network transmission-MOS is a subjective evaluation value from a person, and the network transmission-MOS cannot be directly obtained. Therefore, it is assumed that the XQI is proposed when the video source-MOS and the terminal-MOS are known. In this way, some statistical data at the network side is obtained, so that an XQI obtained through calculation fits the network transmission-MOS better.

The XQI may include two parts: an evaluation score of image quality experience and an evaluation score of interactive experience. In other words, a user experience XQI value may be obtained by combining the evaluation score of image quality experience and the evaluation score of interactive experience. The evaluation score of image quality experience is mainly related to network transmission statistics, such as a packet error situation, a transport block (TB) error situation, the frame rate, a size of a group of pictures (GOP), and another signal source-related parameter. The evaluation score of interactive experience is mainly related to network transmission statistics, such as a packet arrival situation, a packet delay, the frame rate, a GOP, the terminal buffering capability, and another signal source-related or terminal-related parameter.

The XQI may be defined in a plurality of different forms. For example, the XQI may be defined in different forms such as a formula, a neural network, or a table. It may also be understood that there may be a plurality of different modes for obtaining the XQI value. Corresponding to the foregoing forms, the modes may be a formula mode, a neural network mode, a table mode, or the like. The modes may also be collectively referred to as an evaluation mode of user experience. It should be understood that the evaluation mode of user experience is not limited to the foregoing formula mode, the neural network mode, and the table mode, and the evaluation mode of user experience may alternatively be in another form. This is not limited in this application.

For example, when the evaluation mode of user experience is a formula mode, a calculation formula for the XQI may be $XQI = XQI_1 + XQI_2$.

The $XQI_1$ may represent the evaluation score of image quality experience. For example, a calculation formula for the $XQI_1$ may be $$XQI_1 = 100 \times \left(1 - \alpha \times R_{ave} \times \frac{1}{FR}\right).$$

$\alpha$ represents a calculation coefficient. FR represents a frame rate (frame rate, FR) of a video frame, namely, data amounts of video frames displayed per second. For example, a quantity of frames transmitted per second (frames per second, FPS) is 60. $R_{ave}$ represents a frame impairment rate in each GOP and an average frame impairment rate of all GOPs in a statistical cycle. A calculation formula for the frame impairment rate in a GOP may be $$R_{ave} = \frac{N - i}{N}.$$

N represents a size of the GOP, and i represents a position of a first frame that has a transmission error in the current GOP.

The $XQI_2$ may represent the evaluation score of interactive experience. For example, a calculation formula for the $XQI_2$ may be $$XQI_2 = 100 \times \left(1 - \beta \times Q_{ave} \times \frac{1}{FR} \times f(T)\right).$$

$\beta$ represents a calculation coefficient. FR represents a frame rate of a video frame. $Q_{ave}$ represents an average frame skipping rate of all GOPs in the statistical cycle. A calculation formula for a frame skipping rate in a GOP may be $$Q_{ave} = \frac{M}{N}.$$

M represents a quantity of skipped frames in the GOP. N represents a size of the GOP. T represents an N-dimensional vector. Elements of the vector represent delays caused by network transmission of video frames in the GOP.

In other words, a calculation formula for the XQI may be as follows:

$$XQI = 100 \times \left(1 - \alpha \times R_{ave} \times \frac{1}{FR}\right) + 100 \times \left(1 - \beta \times Q_{ave} \times \frac{1}{FR} \times f(T)\right).$$

It should be understood that the foregoing calculation formulas for the XQI, the $XQI_1$, the $XQI_2$, the $R_{ave}$, the $Q_{ave}$, and the like are merely examples, and shall not constitute any limitation on this application.

Figure 6:
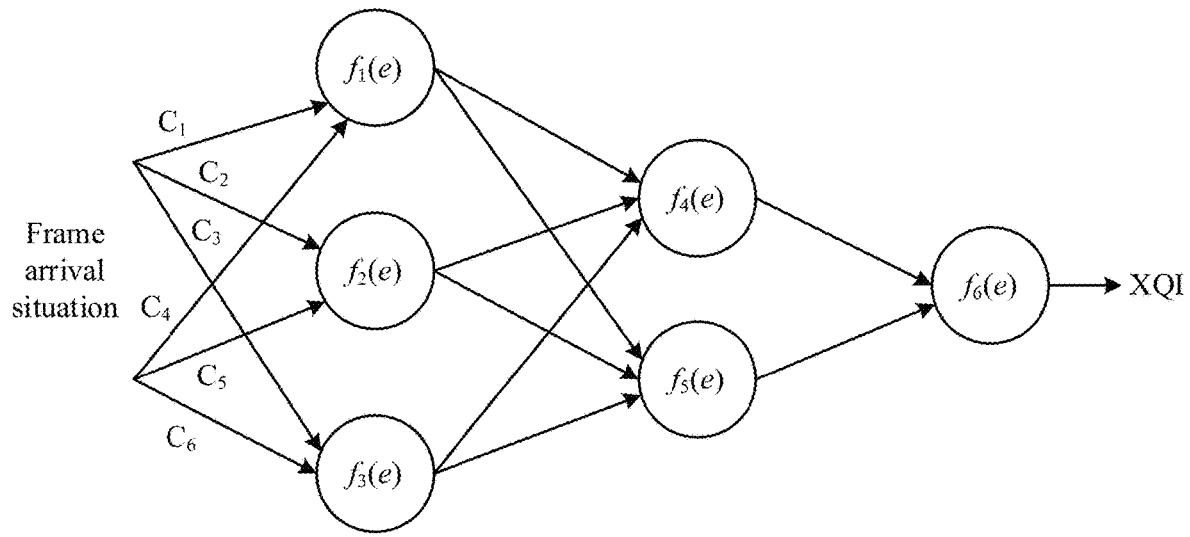
FIG. 6 is a schematic diagram of a neural network constructed for an extended reality quality index (XR quality index, XQI) based on a frame arrival situation.

For example, when the evaluation mode of user experience is the neural network mode, frame arrival situations after the network transmission and corresponding evaluation score situations (for example, in a form of evaluation scores from experts) that are of some typical video sets may be used as a training set, to obtain a neural network based on a frame arrival situation, in other words, a neural network for obtaining an XQI value by combining the frame transmission error situation and the image transmission delay situation. For example, FIG. 6 is a schematic diagram of a neural network constructed for an XQI based on a frame arrival situation. In the figure, $C_1$, $C_2$, $C_3$, $C_4$, $C_5$, and $C_6$ represent weights, and $f_1(e)$, $f_2(e)$, $f_3(e)$, $f_4(e)$, $f_5(e)$, and $f_6(e)$ represent neurons. It should be understood that the neurons are nodes in the neural network, and each node may represent a specific output function.

Figure 7:
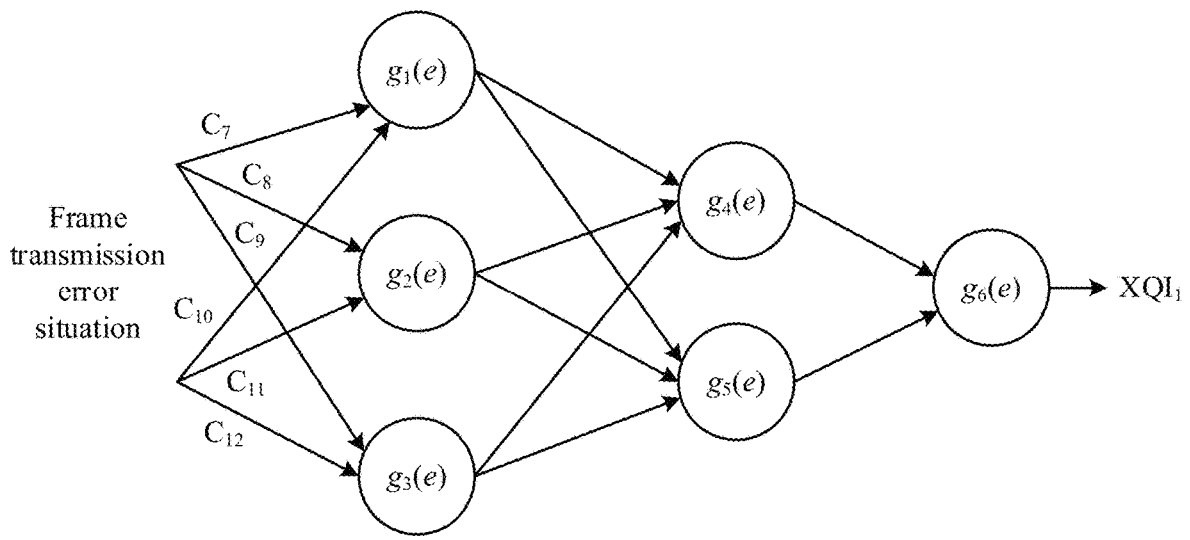
FIG. 7 is a schematic diagram of a neural network constructed for an evaluation score of image quality experience based on a frame transmission error situation.
Figure 8:
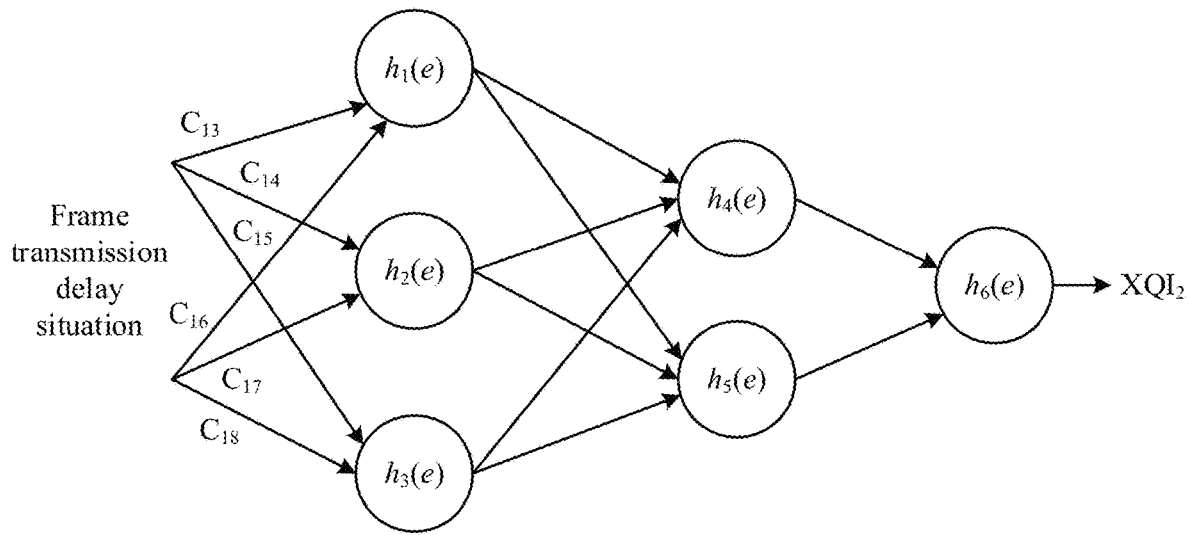
FIG. 8 is a schematic diagram of a neural network constructed for an evaluation score of interactive experience based on a frame transmission delay situation.

Certainly, corresponding neural network modes may alternatively be constructed based on the frame transmission error situation and the frame transmission delay situation respectively. For example, FIG. 7 is a schematic diagram of a neural network constructed for $XQI_1$ based on a frame transmission error situation. In the figure, $XQI_1$ may represent the evaluation score of image quality experience, $C_7$, $C_8$, $C_9$, $C_{10}$, $C_{11}$, and $C_{12}$ represent weights, and $g_1(e)$, $g_2(e)$, $g_3(e)$, $g_4(e)$, $g_5(e)$, and $g_6(e)$ represent neurons. For another example, FIG. 8 is a schematic diagram of a neural network constructed for $XQI_2$ based on a frame transmission delay situation. In the figure, $XQI_2$ may represent the evaluation score of interactive experience, $C_{13}$, $C_{14}$, $C_{15}$, $C_{16}$, $C_{17}$, and $C_{18}$ represent weights, and $h_1(e)$, $h_2(e)$, $h_3(e)$, $h_4(e)$, $h_5(e)$, and $h_6(e)$ represent neurons.

It should be understood that the weights and the neurons in the schematic diagrams of the neural networks shown in FIG. 6, FIG. 7, and FIG. 8 are independent of each other, and may be the same or different. This is not limited in this application. It should be further understood that the schematic diagrams of the neural networks in FIG. 6, FIG. 7, and FIG. 8 are merely examples, and shall not constitute any limitation on this application. For example, in an actual implementation, there may be more or fewer neurons. This is not limited in this application either.

For example, when the evaluation mode of user experience is the table mode, the frame transmission error situation and the frame transmission delay situation are comprehensively considered. In other words, the XQI value depends on the frame transmission error situation and the frame transmission delay situation.

For example, Table 1 shows correspondences between XQI values, frame transmission error situations, and frame transmission delay situations.

TABLE 1

| PER | 0 ms | 5 ms | 10 ms | 15 ms | 20 ms |
|---|---|---|---|---|---|
| | | | XQI | | |
| 0.01 | 100 | 100 | 100 | 98 | 96 |
| 0.02 | 96 | 96 | 96 | 94 | 92 |
| 0.03 | 82 | 82 | 82 | 80 | 78 |
| 0.04 | 76 | 76 | 76 | 74 | 70 |
| 0.05 | 60 | 60 | 60 | 56 | 52 |
| 0.06 | 40 | 40 | 40 | 35 | 30 |
| 0.07 | 20 | 20 | 20 | 18 | 16 |
| 0.08 | 20 | 20 | 20 | 15 | 15 |

In Table 1, the PER is used to approximately represent the frame transmission error situation, and the PDB is used to approximately represent the frame transmission delay situation. In Table 1, the first row may represent different values of the PDB, the first column may represent different values of the PER, and the second to the sixth rows, and the second to the six columns may represent XQI values when different PER values correspond to different PDB values. For example, when the PDB is "5 milliseconds (ms)" and the PER is "0.03", it can be directly learned from the table that the XQI value is "82".

It should be understood that a form, shown in Table 1, used to represent the correspondences between PER, PDB, and XQI is merely an example, and other forms may be used to represent the correspondences other than the table. It should be further understood that the corresponding values of the PER, PDB, and the XQI in the table are also merely examples, and shall not constitute any limitation on this application.

5. Modulation and coding scheme (MCS): The MCS is a rate table in which a concerned factor affecting a communication rate is used as a column of the table, and an MCS index is used as a row. Therefore, each MCS index corresponds to a physical transmission rate based on a group of parameters. For example, Table 2 shows possible correspondences between different MCS indexes, modulation order, target code rates, and spectral efficiency.

TABLE 2

| MCS index $I_{MCS}$ | Modulation order $Q_m$ | Target code rate $R \times [1024]$ | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved (reserved) | |
| 30 | 4 | Reserved | |
| 31 | 6 | Reserved | |

6. Channel quality indicator (CQI): The CQI can indicate current channel quality. The CQI corresponds to a signal-to-noise ratio of the channel. A value range of the CQI is from 0 to 31. When the CQI value is 0, the channel quality is the worst. When the CQI value is 31, the channel quality is the best. Generally, a common value range of the CQI is from 12 to 24. The CQI value may be reported by a terminal to a network device. For example, Table 3 shows possible correspondences between different CQI values, modulation schemes, code rates, and efficiency.

TABLE 3

| CQI | Modulation | Code rate | Efficiency |
|---|---|---|---|
| 0 | Out of range (out of range) | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16-QAM | 378 | 1.4766 |
| 8 | 16-QAM | 490 | 1.9141 |
| 9 | 16-QAM | 616 | 2.4063 |
| 10 | 64-QAM | 466 | 2.7305 |
| 11 | 64-QAM | 567 | 3.3223 |
| 12 | 64-QAM | 666 | 3.9023 |
| 13 | 64-QAM | 772 | 4.5234 |

TABLE 3-continued

| CQI | Modulation | Code rate | Efficiency |
|-----|------------|-----------|------------|
| 14  | 64-QAM     | 873       | 5.1152     |
| 15  | 64-QAM     | 948       | 5.5547     |

In Table 3, different CQI values may correspond to different modulation schemes, code rates, and efficiency. Table 3 lists modulation schemes such as "QPSK", "16-QAM", and "64-QAM" as examples. "QPSK" represents quadrature phase shift keying (QPSK), and "QAM" represents quadrature amplitude modulation (QAM).

The following describes a data transmission method provided in this embodiment of this application in detail with reference to the accompanying drawings.

For ease of understanding, the following description is provided.

The "first", the "second", the "third", and the like are merely intended to distinguish between different objects, and shall not constitute any limitation. For example, first information, second information, third information, and fourth information do not necessarily limit a transmission sequence, but indicate different content included in the information.

Figure 9:
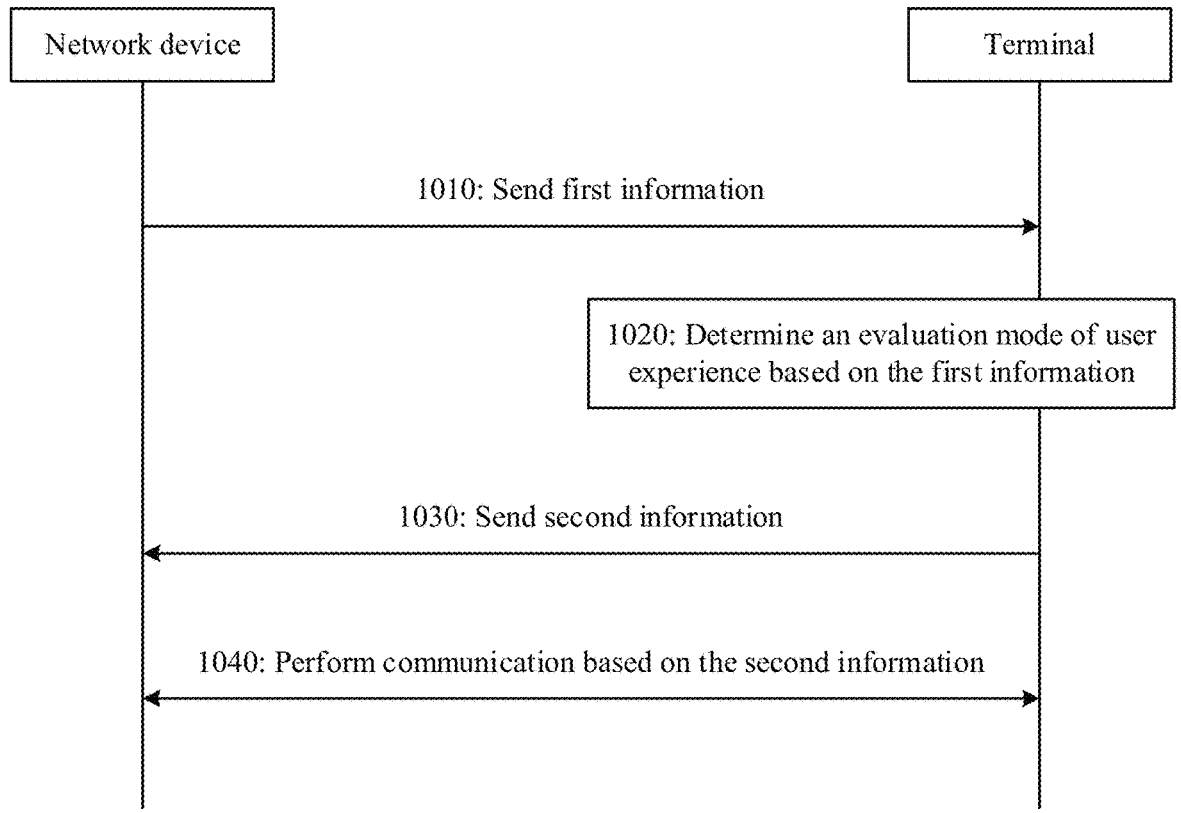
FIG. 9 is a schematic flowchart of a data transmission method according to an embodiment of this application.

FIG. 9 is a schematic flowchart of a data transmission method 1000 according to an embodiment of this application. As shown in FIG. 9, the method 1000 may include step 1010 to step 1040. The following describes the steps in the method 1000 in detail.

In step 1010, a network device sends first information to a terminal. Correspondingly, the terminal receives the first information from the network device.

The first information is used to configure an evaluation mode of user experience. The evaluation mode of user experience is one of a plurality of evaluation modes of user experience, and the evaluation mode of user experience is used to evaluate impact of network transmission on user experience.

As described above, the XQI is used to evaluate the impact of the network transmission on user experience. There may be a plurality of different modes for obtaining the XQI value, for example, the formula mode, the neural network mode, or the table mode.

In addition, as described above, the XQI may include two parts: the evaluation score of image quality experience and the evaluation score of interactive experience. The evaluation mode of user experience includes an evaluation mode of image quality experience and an evaluation mode of interactive experience. The evaluation mode of image quality experience is used to evaluate impact of a transmission error on image quality experience. The evaluation mode of interactive experience is used to evaluate impact of a transmission delay on interactive experience.

In a possible implementation, the terminal may prestore a plurality of evaluation modes of user experience.

Optionally, the plurality of evaluation modes of user experience prestored in the terminal may be an evaluation mode of user experience in which impact of the transmission error on image quality experience is integrated with impact of the transmission delay on interactive experience. In other words, the plurality of evaluation modes of user experience for obtaining an XQI value are stored.

For example, each of the plurality of evaluation modes of user experience may correspond to one index value, and the evaluation mode of user experience and the index value may be stored in the terminal in a form of a table.

For example, Table 4 shows correspondences between the plurality of evaluation modes of user experience, and indexes.

TABLE 4

| Index | Evaluation mode of user experience |
|-------|-------------------------------------|
| 1 | $XQI = 100 \times \left(1 - \alpha \times R_{ave} \times \frac{1}{FR}\right) + 100 \times \left(1 - \beta \times Q_{ave} \times \frac{1}{FR} \times f(T)\right)$ |
| 2 | Neural network constructed for an XQI based on a frame arrival situation |
| ... | ... |
| N | Table 1 |

Certainly, the evaluation mode of image quality experience and the evaluation mode of interactive experience may alternatively be separately configured. For example, Table 5 shows correspondences between a plurality of evaluation modes of image quality experience, and the indexes. Table 6 shows correspondences between the plurality of evaluation modes of interactive experience, and the indexes.

TABLE 5

| Index | Evaluation mode of image quality experience |
|-------|----------------------------------------------|
| 1 | $XQI_1 = 100 \times \left(1 - \alpha \times R_{ave} \times \frac{1}{FR}\right)$ |
| 2 | Neural network constructed for $XQI_1$ based on a frame transmission error situation |
| ... | ... |

TABLE 6

| Index | Evaluation mode of interactive experience |
|-------|--------------------------------------------|
| 1 | $XQI_2 = 100 \times \left(1 - \beta \times Q_{ave} \times \frac{1}{FR} \times f(T)\right)$ |
| 2 | Neural network constructed for $XQI_2$ based on a frame transmission delay situation |
| ... | ... |

After the terminal requests an XR service from the network device, the network device may send the first information to the terminal through signaling after identifying the XR service request of the terminal. The first information may include an index value corresponding to an evaluation mode of user experience. In this way, the evaluation mode of user experience that can be used by the terminal is configured.

Certainly, the terminal may alternatively prestore the plurality of evaluation modes of user experience in another form. Forms for storing the correspondences between the evaluation mode of user experiences and the indexes are not limited to the table form, such as Table 4, Table 5, Table 6, or the like.

It should be understood that in Table 4, Table 5, and Table 6, coefficients or parameters in the formula mode and the neural network mode may be specific known values that are preset. For example, α and β in the formula may be preset specific values.

Optionally, the first information may be further used to configure a parameter of the evaluation mode of user experience.

If the plurality of evaluation modes of user experience prestored in the terminal are evaluation modes of user experience including to-be-determined parameters. For example, the formula mode and the neural network mode include to-be-determined parameters. In this case, the first information may further include a specific value of a to-be-determined parameter included in an evaluation mode of user experience. In other words, the first information may indicate an index of the evaluation mode of user experience and the specific value of the to-be-determined parameter included in the evaluation mode of user experience.

Optionally, the network device may send third information to the terminal. The third information is used to configure a parameter of the evaluation mode of user experience.

After the terminal requests an XR service from the network device, the network device may send the first information to the terminal through signaling after identifying the XR service request of the terminal. The first information may include an evaluation mode of user experience. In this way, the evaluation mode of user experience that includes the to-be-determined parameter and that can be used by the terminal is configured. The network device may further send the third information to the terminal through signaling. The third information may indicate a specific parameter value for the configured evaluation mode of user experience including the to-be-determined parameter. In this way, the parameter of the evaluation mode of user experience that includes the to-be-determined parameter and that is specified to be used by the terminal is configured.

It should be further understood that the foregoing bearer signaling of the first information may be radio resource control (RRC) signaling, downlink control information (DCI), or a system information block (SIB), and the foregoing bearer signaling of the third information may be RRC signaling or DCI. This is not limited in this application.

In step 1020, the terminal determines the evaluation mode of user experience based on the first information.

The terminal receives the first information from the network device, and may determine the evaluation mode of user experience based on the first information.

In a possible implementation, the terminal may prestore, in the form shown in Table 4, correspondences between a plurality of evaluation modes of user experience that do not include to-be-determined parameters, and indexes. The terminal receives the first information from the network device. In this case, the first information may indicate an index corresponding to an evaluation mode of user experience that does not include a to-be-determined parameter. Alternatively, the first information includes an index corresponding to an evaluation mode of user experience that does not include a to-be-determined parameter. The terminal may determine, based on the index, the evaluation mode of user experience that does not include the to-be-determined parameter and that can be used.

For example, the first information indicates index 1. In this case, the terminal may determine, based on Table 4 prestored in the terminal, that the evaluation mode of user experience is the formula mode $$XQI = 100 \times \left(1 - \alpha \times R_{ave} \times \frac{1}{FR}\right) + 100 \times \left(1 - \beta \times Q_{ave} \times \frac{1}{FR} \times f(T)\right),$$

where specific values of α and β are known.

In another possible implementation, the terminal may prestore, in the form shown in Table 4, correspondences between a plurality of evaluation modes of user experience including to-be-determined parameters, and indexes. The terminal receives the first information from the network device. In this case, the first information may indicate an index corresponding to an evaluation mode of user experience including a to-be-determined parameter, and a specific value of the to-be-determined parameter. Alternatively, the first information includes an index corresponding to an evaluation mode of user experience including a to-be-determined parameter, and a specific value of the to-be-determined parameter. The terminal may determine, based on the index and the specific value of the to-be-determined parameter, the evaluation mode of user experience that includes the to-be-determined parameter and that can be used. In this implementation, the terminal may determine the parameter of the evaluation mode of user experience based on the first information.

For example, the first information indicates index 1. In this case, the terminal may determine, based on Table 4 prestored in the terminal, that the evaluation mode of user experience is the formula mode $$XQI = 100 \times \left(1 - \alpha \times R_{ave} \times \frac{1}{FR}\right) + 100 \times \left(1 - \beta \times Q_{ave} \times \frac{1}{FR} \times f(T)\right),$$

where α and β are the to-be-determined parameters.

In still another possible implementation, the terminal may prestore, in the form shown in Table 4, correspondences between a plurality of evaluation modes of user experience including to-be-determined parameters, and indexes. The terminal receives the first information from the network device. In this case, the first information may indicate an index corresponding to an evaluation mode of user experience including a to-be-determined parameter. Alternatively, the first information includes an index corresponding to an evaluation mode of user experience including a to-be-determined parameter. The terminal may determine, based on the index, the evaluation mode of user experience that includes the to-be-determined parameter and that can be used. In this implementation, the terminal further receives the third information from the network device. The third information may indicate a specific value of the to-be-determined parameter of the evaluation mode of user experience that includes the to-be-determined parameter and that is determined based on the first information. Alternatively, the third information may include a specific value of the to-be-determined parameter of the evaluation mode of user experience that includes the to-be-determined parameter and that is determined based on the first information. The terminal may determine the parameter of the evaluation mode of user experience based on the third information.

Optionally, before performing step 1030, the terminal may further determine the impact of the network transmission on user experience based on the evaluation mode of user experience.

In a possible implementation, the terminal prestores, in the form shown in Table 4, correspondences between a plurality of evaluation modes of user experience that do not include to-be-determined parameters, and indexes. When the terminal receives the first information from the network device, and determines, based on the first information, an evaluation mode of user experience that does not include a to-be-determined parameter, the terminal determines the impact of the network transmission on user experience based on the evaluation mode of user experience that does not include the to-be-determined parameter.

For example, the first information indicates index 1. In this case, the terminal may determine, based on Table 4 prestored in the terminal, that the evaluation mode of user experience is the formula mode $$XQI = 100 \times \left(1 - \alpha \times R_{ave} \times \frac{1}{FR}\right) + 100 \times \left(1 - \beta \times Q_{ave} \times \frac{1}{FR} \times f(T)\right),$$

where specific values of α and β are known. The terminal may determine the specific values of α and β based on the first information, and calculate an XQI value according to the formula. The obtained XQI value may represent the impact of the network transmission on user experience.

For another example, the evaluation mode of user experience determined by the terminal is a neural network mode, that is, a neural network constructed for an XQI based on a frame arrival situation. The terminal may obtain an XQI value based on the neural network. The obtained XQI value may represent the impact of the network transmission on user experience.

Optionally, before performing step 1030, the terminal may further determine the impact of the network transmission on user experience based on the evaluation mode of user experience and the parameter of the evaluation mode of user experience.

In a possible implementation, the terminal may prestore, in the form shown in Table 4, correspondences between a plurality of evaluation modes of user experience including to-be-determined parameters, and indexes. When the terminal receives the first information from the network device, and determines, based on the first information, an evaluation mode of user experience including to-be-determined parameters, and the parameters of the evaluation mode of user experience, the terminal applies the parameter values to the evaluation mode of user experience including the to-be-determined parameters, and determines the impact of the network transmission on user experience based on the evaluation mode of user experience including the to-be-determined parameters.

For example, the first information indicates index 1. In this case, the terminal may determine, based on Table 4 prestored in the terminal, that the evaluation mode of user experience is the formula mode $$XQI = 100 \times \left(1 - \alpha \times R_{ave} \times \frac{1}{FR}\right) + 100 \times \left(1 - \beta \times Q_{ave} \times \frac{1}{FR} \times f(T)\right),$$

where α and β are the to-be-determined parameters. The terminal applies specific values of α and β obtained based on the first information to the formula. The terminal may calculate an XQI value according to the formula. The obtained XQI value may represent the impact of the network transmission on user experience.

In another possible implementation, the terminal may prestore, in the form shown in Table 4, correspondences between a plurality of evaluation modes of user experience including to-be-determined parameters, and indexes. When the terminal receives the first information and the third information from the network device, determines, based on the first information, an evaluation mode of user experience including to-be-determined parameters, and determines parameters of the evaluation mode of user experience based on the third information, the terminal applies the parameter values to the evaluation mode of user experience including the to-be-determined parameters, and determines the impact of the network transmission on user experience based on the evaluation mode of user experience including the to-be-determined parameters.

For example, the first information indicates index 1. In this case, the terminal may determine, based on Table 4 prestored in the terminal, that the evaluation mode of user experience is the formula mode $$XQI = 100 \times \left(1 - \alpha \times R_{ave} \times \frac{1}{FR}\right) + 100 \times \left(1 - \beta \times Q_{ave} \times \frac{1}{FR} \times f(T)\right),$$

where α and β are the to-be-determined parameters. The terminal applies specific values of α and β obtained based on the third information to the formula. The terminal may calculate an XQI value according to the formula. The obtained XQI value may represent the impact of the network transmission on user experience.

It should be understood that for different terminals, the network device may configure, based on different service requirements of the terminals, different specific values of the to-be-determined parameters for the terminals through signaling. It may also be understood that the specific values that are of the to-be-determined parameters and that are included in or indicated by the first information or the third information sent by the network device to different terminals may be different.

In step 1030, the terminal sends second information to the network device. Correspondingly, the network device receives the second information from the terminal.

It should be understood that the second information includes information about the impact of the network transmission on user experience. The information about the impact of the network transmission on user experience includes evaluation information of image quality experience and evaluation information of interactive experience. The evaluation mode of image quality experience is used to determine the evaluation information of image quality experience. The evaluation mode of interactive experience is used to determine the evaluation information of interactive experience. The information about the impact of the network transmission on user experience indicates an evaluation score of extended reality quality. The evaluation mode of image quality experience and the evaluation mode of interactive experience are used to determine the evaluation score of the extended reality quality.

In a possible implementation, the information about the impact of the network transmission on user experience included in the second information sent by the terminal to the network device may indicate the evaluation score of the extended reality quality. It may also be understood that the terminal sends the evaluation score of the extended reality quality to the network device. In other words, the terminal sends the XQI value to the network device.

It should be understood that before the terminal sends the evaluation score of the extended reality quality to the network device, the terminal may first determine the evaluation score of the extended reality quality. In other words, the terminal may first determine the XQI value. For example, the foregoing terminal obtains the XQI value based on the first information or based on the first information and the third information. For brevity, details are not described herein again.

Optionally, the terminal may determine the evaluation score of the extended reality quality based on the evaluation mode of image quality experience and the evaluation mode of interactive experience.

For example, the terminal prestores, in the form shown in Table 5, correspondences between a plurality of evaluation modes of image quality experience that do not include to-be-determined parameters, and indexes, and prestores, in the form shown in Table 6, correspondences between a plurality of evaluation modes of interactive experience that do not include to-be-determined parameters, and indexes. The terminal receives the first information from the network device. The first information indicates that an index for determining the evaluation mode of image quality experience is 1, and an index for determining the evaluation mode of interactive experience is 2. In this case, the terminal may determine, based on the index, that the image quality experience mode is the formula mode $$XQI_1 = 100 \times \left(1 - \alpha \times R_{ave} \times \frac{1}{FR}\right),$$

where a specific value of $\alpha$ is known. $XQI_1$ may be calculated according to the formula. The terminal determines, based on the index, that the interactive experience mode is a neural network mode, that is, a neural network constructed for $XQI_2$ based on a frame arrival situation. $XQI_2$ is obtained based on the neural network. Then, an XQI value is obtained through calculation based on a relationship between XQI, $XQI_1$, and $XQI_2$ that is prestored in the terminal, for example, the foregoing formula $XQI=XQI_1+XQI_2$. In other words, the evaluation score of the extended reality quality is obtained.

In another possible implementation, the terminal sends second information to the network device. Information about the impact of the network transmission on user experience included in the second information include evaluation information of image quality experience and evaluation information of interactive experience. The evaluation information of image quality experience indicates a coefficient of the impact of the transmission error on image quality experience or an evaluation score. The evaluation information of interactive experience indicates a coefficient of the impact of the transmission delay on interactive experience or an evaluation score. It may also be understood that the terminal sends, to the network device, the coefficient of the impact of the transmission error on image quality experience or the evaluation score, and the coefficient of the impact of the transmission delay on interactive experience or the evaluation score.

It should be understood that before the terminal sends, to the network device, the coefficient of the impact of the transmission error on image quality experience or the evaluation score, and the coefficient of the impact of the transmission delay on interactive experience or the evaluation score, the terminal may determine the evaluation information of image quality experience based on the evaluation mode of image quality experience, and determine the evaluation information of interactive experience based on the evaluation mode of interactive experience.

For example, when the terminal obtains the XQI value. It is assumed that the XQI value is $XQI_a$ when all frames in a statistical cycle are correctly received. In this case, a formula for calculating a coefficient $w_1$ of impact of a transmission error on image quality experience may be $$w_1 = \frac{XQI_a - XQI}{XQI_a}.$$

For another example, when the terminal obtains the XQI value. It is assumed that the XQI value is $XQI_b$ when all frames in the statistical cycle are received by the terminal within a delay constraint. In this case, a formula for calculating a coefficient $w_2$ of impact of a transmission delay on interactive experience may be $$w_2 = \frac{XQI_b - XQI}{XQI_b}.$$

For example, in FIG. 4, the first frame, the third frame, and the sixth frame may be normally displayed, the second frame has a transmission error, the fourth frame has a transmission error and has a transmission delay, and the fifth frame has a transmission delay. In this case, a corresponding real XQI value may be obtained based on the first information. It is assumed that all frames in the statistical cycle are correctly received. In this case, the first frame, the second frame, the third frame, and the sixth frame may be normally displayed. The fourth frame and the fifth frame have the transmission delays. Based on this assumption, the XQI value is $XQI_a$. In this case, $w_1$ may indicate impact of the frame transmission error on the XQI. It is assumed that all frames in the statistical cycle are received by the terminal within a delay constraint. In this case, the first frame, the third frame, the fifth frame, and the sixth frame may be normally displayed, and the second frame and the fourth frame have the transmission errors. Based on this assumption, the XQI value is $XQI_b$. In this case, $w_2$ may indicate impact of the transmission delay on the XQI.

Therefore, when the XQI value, the $XQI_a$ value, and the $XQI_b$ value are determined by the terminal, the terminal sends, to the network device, the coefficient $w_1$ of the impact of the transmission error on image quality experience and the coefficient $w_2$ of the impact of the transmission delay on interactive experience. Alternatively, the terminal sends, to the network device, the coefficient $w_1$ of the impact of the transmission error on image quality experience and an evaluation score of interactive experience. Alternatively, the terminal sends, to the network device, an evaluation score of image quality experience and the coefficient $w_2$ of the impact of the transmission delay on interactive experience. Alternatively, the terminal sends, to the network device, the evaluation score of image quality experience and the evaluation score of interactive experience.

It should be understood that the formulas $$w_1 = \frac{XQI_a - XQI}{XQI_a} \text{ and } w_2 = \frac{XQI_b - XQI}{XQI_b}$$

are merely examples, and shall not constitute any limitation on this application.

In step 1040, the network device communicates with the terminal based on the second information.

The network device may adjust behavior of communication between the network device and the terminal based on the second information sent by the terminal, for example, reduce an MCS and/or increase a scheduling priority.

The network device may determine, based on the second information and a CQI, an MCS used for communication with the terminal. The terminal receives fourth information from the network device. The fourth information indicates the MCS, and the MCS is related to the second information and the CQI. Therefore, the network device may communicate with the terminal based on the MCS.

It should be understood that bearer signaling of the fourth information may be DCI.

In a possible implementation, when the terminal sends the XQI value to the network device, the network device adjusts the behavior of communication between the network device and the terminal based on the XQI value, and communicates with the terminal based on adjusted communication behavior.

If a current XQI value is less than a target XQI value, the network device may reduce the MCS and/or increase the scheduling priority, and communicate with the terminal based on a reduced MCS and/or an increased scheduling priority.

The reduced MCS may be determined based on the XQI value and the CQI. For example, the reduced MCS may be determined according to a formula $I_2=I_1-\lfloor(XQI_0-XQI)/10\rfloor$. $I_1$ represents a current MCS index, $I_2$ represents a reduced MCS index, $XQI_0$ represents the target XQI value, and XQI represents the current XQI value.

As described above, the CQI value may be reported by the terminal to the network device. After the network device receives the CQI value sent by the terminal, the network device may first determine the current MCS index based on a CQI-MCS mapping relationship. For example, if the CQI value sent by the terminal is 3, the XQI value is 70, and the target XQI value is 80, in this case, it may be determined, based on Table 3, that the current code rate is 193. In Table 2, an MCS index corresponding to the code rate 193 is 3. In other words, a value of $I_1$ is 4, and an $XQI_0$ value is 80. In this case, $I_2$ obtained through calculation is 2 according to the foregoing formula.

A larger difference between the XQI value and the $XQI_0$ value indicates a larger increase in the scheduling priority. A smaller difference between the XQI value and the $XQI_0$ value indicates a smaller increase in the scheduling priority.

In another possible implementation, when the terminal sends $w_1$ and $w_2$ to the network device, the network device adjusts the behavior of communication between the network device and the terminal based on $w_1$ and $w_2$, and communicates with the terminal based on adjusted communication behavior.

The network device may reduce the MCS based on a value of $w_1$, and communicate with the terminal based on a reduced MCS, and/or may increase a scheduling priority based on $w_2$, and communicate with the terminal based on an adjusted scheduling priority.

The reduced MCS may be determined based on the value of $w_1$ and the CQI. For example, the reduced MCS may be determined according to a formula $I_2=I_1-\lfloor 2w_1 \rfloor$. $I_1$ represents a current MCS index, $I_2$ represents a reduced MCS index, and $w_1$ is the coefficient of the impact of the transmission error on image quality experience.

The scheduling priority may be adjusted based on $w_2$. A larger value of $w_2$ indicates a larger increase in the scheduling priority. A smaller value of $w_2$ indicates a smaller increase in the scheduling priority.

In still another possible implementation, when the terminal sends $XQI_1$ and $XQI_2$ to the network device, the network device adjusts the behavior of communication between the network device and the terminal based on $XQI_1$ and $XQI_2$, and communicates with the terminal based on adjusted communication behavior.

When the current $XQI_1$ value is less than a value of a target evaluation score of image quality experience $XQI_i^0$, the network device may reduce the MCS based on the $XQI_1$ value, and communicate with the terminal based on a reduced MCS. When the current $XQI_2$ value is less than a value of a target evaluation score of interactive experience $XQI_2^0$, the network device may increase the scheduling priority based on $XQI_2$, and communicate with the terminal based on an adjusted scheduling priority.

The reduced MCS may be determined based on the XQI value and the CQI. For example, the reduced MCS may be determined according to a formula $I_2=I_1-\max(\lfloor(XQI_1^0-XQI_1)/10\rfloor, 0)$. $I_1$ represents a current MCS index, $I_2$ represents a reduced MCS index, $XQI_1^0$ represents the target evaluation score of image quality experience, and $XQI_1$ represents a current evaluation score of image quality experience.

The scheduling priority may be adjusted based on $XQI_2$. A larger difference between $XQI_2$ and $XQI_2^0$ indicates a larger increase in the scheduling priority. A smaller difference between $XQI_2$ and $XQI_2^0$ indicates a smaller increase in the scheduling priority.

It should be understood that in the foregoing three possible implementations, the formulas $I_2=I_1-\lfloor(XQI_0-XQI)/10\rfloor$, $I_2=I_1-\lfloor 2w_1\rfloor$, and $I_2=I_1-\max(\lfloor(XQI_1^0-XQI_1)/10\rfloor, 0)$ are merely examples, and shall not constitute any limitation on this application.

It should be noted that when the evaluation score of image quality experience is known, the network device may separately configure the evaluation mode of interactive experience for the terminal through signaling, so that the terminal determines the evaluation score of interactive experience, and feeds back the evaluation score of interactive experience to the network device. When the evaluation score of interactive experience is known, the network device may also separately configure the evaluation mode of image quality experience for the terminal through signaling, so that the terminal determines the evaluation score of image quality experience, and feeds back the evaluation score of image quality experience to the network device.

According to the data transmission method provided in this application, the network device may configure, for the terminal by using the first information, the evaluation mode of user experience used to determine impact of the network transmission status on user experience. In this way, the terminal may obtain information about the impact of the network transmission status on user experience based on the evaluation mode of user experience configured by the network device. The network device configures the evaluation mode of user experience for the terminal. Therefore, a manner for measuring user experience by each terminal is controllable. Thus, the network device may accurately adjust the behavior of communication between the network device and the terminal based on impact, fed back by the terminal, of the network transmission on user experience. In this way, system efficiency and user experience are improved.

The method may further effectively and accurately measure impact of network transmission quality on XR user experience, to indicate, based on the evaluation score of the extended reality quality, the evaluation score of image quality experience, and/or the evaluation score of interactive experience, an operator to construct a network. Scheduling optimization, network planning, network optimization, and fault locating are performed based on the evaluation score of the extended reality quality, the evaluation score of image quality experience, and/or the evaluation score of interactive experience.

Figure 10:
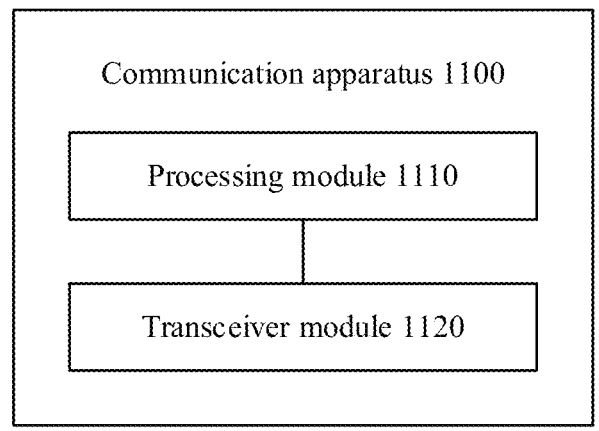
FIG. 10 is a schematic block diagram of a communication apparatus according to an embodiment of this application.

FIG. 10 is a schematic block diagram of a communication apparatus according to an embodiment of this application. As shown in FIG. 10, the communication apparatus 1100 may include a processing module 1110 and a transceiver module 1120. The communication apparatus 1100 may be configured to perform steps performed by the network device and/or the terminal in the data transmission method 1000.

When the communication apparatus 1100 is configured to perform the steps performed by the network device in the data transmission method 1000, the transceiver module 1120 may be configured to send first information to a terminal, and receive second information from the terminal. The processing module 1110 and the transceiver module 1120 may cooperate with each other to communicate with the terminal based on the second information. The first information is used to configure an evaluation mode of user experience. The evaluation mode of user experience is one of a plurality of evaluation modes of user experience. The evaluation mode of user experience is used to evaluate impact of network transmission on user experience. The second information includes information about the impact of the network transmission on user experience.

Optionally, the first information is further used to configure a parameter of the evaluation mode of user experience.

Optionally, the transceiver module 1120 is further configured to send third information to the terminal. The third information is used to configure a parameter of the evaluation mode of user experience.

Optionally, the evaluation mode of user experience includes an evaluation mode of image quality experience and an evaluation mode of interactive experience. The evaluation mode of image quality experience is used to evaluate impact of a transmission error on image quality experience. The evaluation mode of interactive experience is used to evaluate impact of a transmission delay on interactive experience.

Optionally, the information about the impact of the network transmission on user experience includes evaluation information of image quality experience and evaluation information of interactive experience. The evaluation mode of image quality experience is used to determine the evaluation information of image quality experience. The evaluation mode of interactive experience is used to determine the evaluation information of interactive experience.

Optionally, the evaluation information of image quality experience indicates a coefficient of the impact of the transmission error on image quality experience or an evaluation score. The evaluation information of interactive experience indicates a coefficient of the impact of the transmission delay on interactive experience or an evaluation score.

Optionally, the information about the impact of the network transmission on user experience indicates an evaluation score of extended reality quality. The evaluation mode of image quality experience and the evaluation mode of interactive experience are used to determine the evaluation score of the extended reality quality.

Optionally, the processing module 1110 may be configured to determine, based on the second information and a CQI, an MCS used for communication with the terminal. The transceiver module 1120 may be configured to communicate with the terminal based on the MCS.

When the communication apparatus 1100 is configured to perform the steps performed by the terminal in the data transmission method 1000, the transceiver module 1120 may be configured to: receive first information from a network device, and send second information to the network device. The processing module 1110 may be configured to determine the evaluation mode of user experience based on the first information. The evaluation mode of user experience is one of a plurality of evaluation modes of user experience. The evaluation mode of user experience is used to evaluate impact of network transmission on user experience. The second information includes information about the impact of the network transmission on user experience.

Optionally, the processing module 1110 may be further configured to determine the impact of the network transmission on user experience based on the evaluation mode of user experience.

Optionally, the processing module 1110 may be further configured to determine a parameter of the evaluation mode of user experience based on the first information.

Optionally, the transceiver module 1120 may be further configured to receive third information from the network device. The processing module 1110 may be further configured to determine a parameter of the evaluation mode of user experience based on the third information.

Optionally, the processing module 1110 may be further configured to determine the impact of the network transmission on user experience based on the evaluation mode of user experience and the parameter of the evaluation mode of user experience.

Optionally, the evaluation mode of user experience includes an evaluation mode of image quality experience and an evaluation mode of interactive experience. The evaluation mode of image quality experience is used to evaluate impact of a transmission error on image quality experience. The evaluation mode of interactive experience is used to evaluate impact of a transmission delay on interactive experience.

Optionally, the information about the impact of the network transmission on user experience includes evaluation information of image quality experience and evaluation information of interactive experience. The processing module 1110 may be further configured to determine the evaluation information of image quality experience based on the evaluation mode of image quality experience, and determine the evaluation information of interactive experience based on the evaluation mode of interactive experience.

Optionally, the evaluation information of image quality experience indicates a coefficient of the impact of the transmission error on image quality experience or an evaluation score. The evaluation information of interactive experience indicates a coefficient of the impact of the transmission delay on interactive experience or an evaluation score.

Optionally, the information about the impact of the network transmission on user experience indicates an evaluation score of extended reality quality. The processing module 1110 may be further configured to determine the evaluation score of the extended reality quality based on the evaluation mode of image quality experience and the evaluation mode of interactive experience.

Optionally, the transceiver module 1120 may be further configured to receive fourth information from the network device. The fourth information indicates an MCS, and the MCS is related to the second information and a channel quality indicator CQI.

Figure 11:
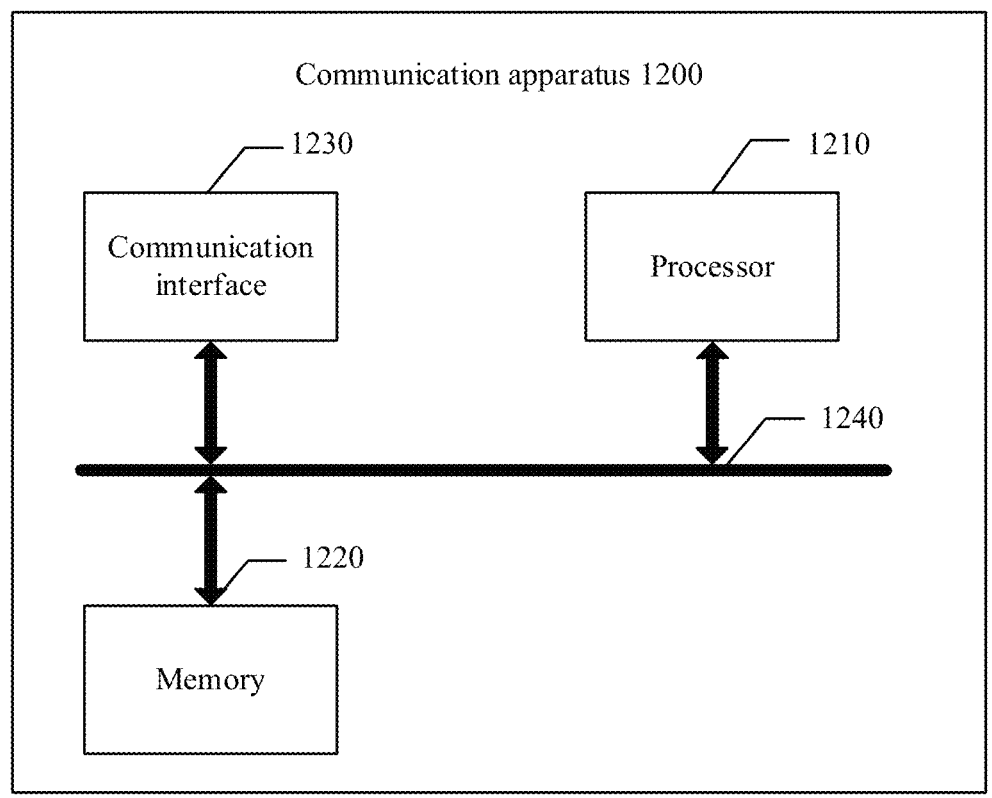
FIG. 11 is another schematic block diagram of a communication apparatus according to an embodiment of this application.

FIG. 11 is another schematic block diagram of a communication apparatus according to an embodiment of this application. The communication apparatus 1200 may be configured to implement functions of the network device and/or the terminal in the foregoing method. The communication apparatus 1200 may be a chip system. In this embodiment of this application, the chip system may include a chip, or may include a chip and another discrete device.

As shown in FIG. 11, the communication apparatus 1200 may include at least one processor 1210, configured to implement the functions of the network device and/or the terminal in the method provided in embodiments of this application.

For example, when the communication apparatus 1200 is configured to implement the functions of the network device in the method provided in embodiments of this application, the processor 1210 may be configured to: send first information to a terminal, receive second information from the terminal, and communicate with the terminal based on the second information. The first information is used to configure an evaluation mode of user experience. The evaluation mode of user experience is one of a plurality of evaluation modes of user experience. The evaluation mode of user experience is used to evaluate impact of network transmission on user experience. The second information includes information about the impact of the network transmission on user experience. For details, refer to detailed descriptions in the method examples. Details are not described herein again.

For example, when the communication apparatus 1200 is configured to implement the functions of the terminal in the method provided in embodiments of this application, the processor 1210 may be configured to receive first information from a network device, determine an evaluation mode of user experience based on the first information, and send second information to the network device. The evaluation mode of user experience is one of a plurality of evaluation modes of user experience. The evaluation mode of user experience is used to evaluate impact of network transmission on user experience. The second information includes information about the impact of the network transmission on user experience. For details, refer to detailed descriptions in the method examples. Details are not described herein again.

The communication apparatus 1200 may further include at least one memory 1220, configured to store program instructions and/or data. The memory 1220 is coupled to the processor 1210. The coupling in this embodiment of this application may be an indirect coupling or a communication connection between apparatuses, units, or modules, may be in an electrical form, a mechanical form, or another form, and is used for information exchange between the apparatuses, the units, or the modules. The processor 1210 may operate in collaboration with the memory 1220. The processor 1210 may execute the program instructions stored in the memory 1220. At least one of the at least one memory may be included in the processor.

The communication apparatus 1200 may further include a communication interface 1230, configured to communicate with another device by using a transmission medium, so that an apparatus used in the communication apparatus 1200 may communicate with the another device. For example, when the communication apparatus 1200 is configured to implement the functions of the network device in the method provided in embodiments of this application, the another device may be a terminal. When the communication apparatus 1200 is configured to implement the functions of the terminal in the method provided in embodiments of this application, the another device may be a network device.

The communication interface 1230 may be, for example, a transceiver, an interface, a bus, a circuit, or an apparatus that can implement a transceiver function. The processor 1210 may receive/transmit data and/or information by using the communication interface 1230, and is configured to implement the method performed by the network device and/or the terminal in the embodiment corresponding to FIG. 9.

A specific connection medium between the processor 1210, the memory 1220, and the communication interface 1230 is not limited in this embodiment of this application. In this embodiment of this application, in FIG. 11, the processor 1210, the memory 1220, and the communication interface 1230 are connected by using a bus 1240. The bus 1240 is represented by a bold line in FIG. 11, and a connection manner between other components is merely described as an example, and is not limited thereto. The bus may be classified into an address bus, a data bus, a control bus, and the like. For ease of representation, only one bold line is used to represent the bus in FIG. 11, but this does not mean that there is only one bus or only one type of bus.

Figure 12:
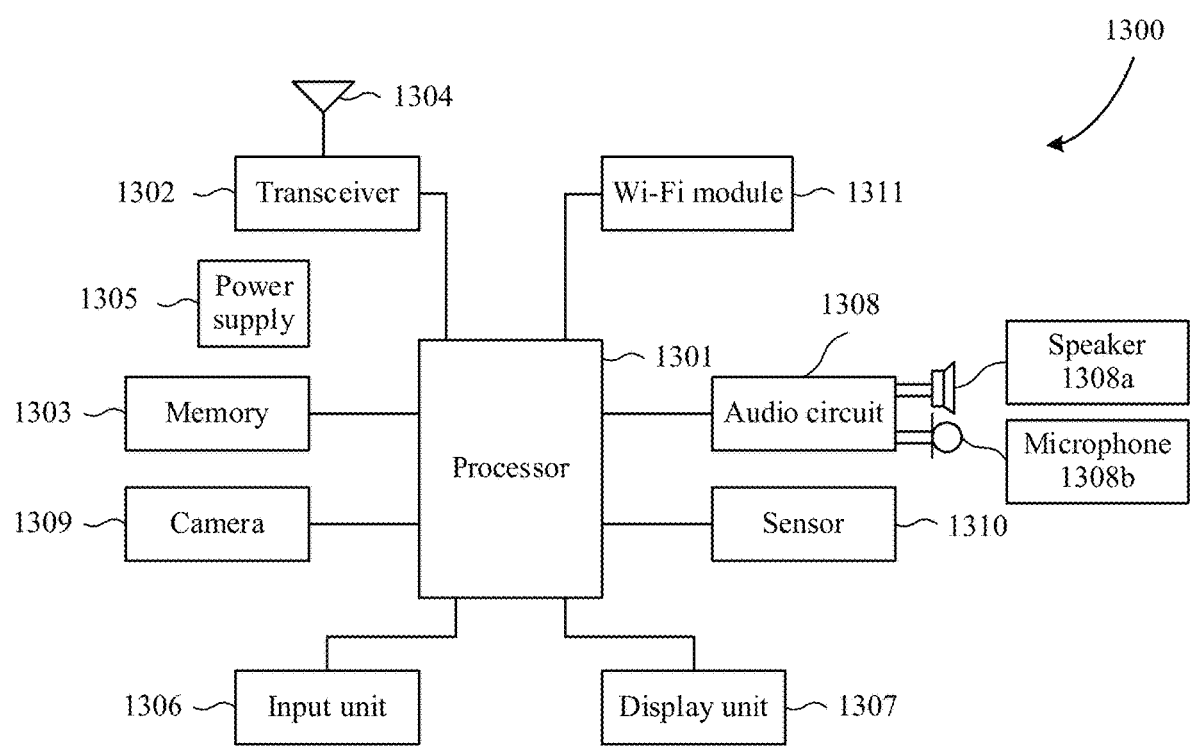
FIG. 12 is a schematic block diagram of a structure of a terminal according to an embodiment of this application.

FIG. 12 is a schematic diagram of a structure of a terminal according to an embodiment of this application. The terminal 1300 has the functions of the terminal shown in FIG. 9. The terminal 1300 may be used in the communication system 100 shown in FIG. 1 or the communication system 200 shown in FIG. 2. As shown in FIG. 12, the terminal 1300 includes a processor 1301 and a transceiver 1302. Optionally, the terminal device 1300 further includes a memory 1303. The processor 1301, the transceiver 1302, and the memory 1303 communicate with each other through an internal connection path, to transfer a control signal and/or a data signal. The memory 1303 is configured to store a computer program. The processor 1301 is configured to invoke the computer program from the memory 1303 and run the computer program, to control the transceiver 1302 to receive/transmit a signal. Optionally, the terminal 1300 may further include an antenna 1304, configured to send, by using a radio signal, uplink data or uplink control signaling that is output by the transceiver 1302. Optionally, the terminal 1300 further includes a Wi-Fi module 1311, configured to access a wireless network.

The processor 1301 and the memory 1303 may be integrated into one communication apparatus. The processor 1301 is configured to execute program code stored in the memory 1303, to implement the foregoing functions. During specific implementation, the memory 1303 may alternatively be integrated into the processor 1301, or may be independent of the processor 1301. The processor 1301 may correspond to the processing module 1110 in FIG. 10 or the processor 1210 in FIG. 11.

The transceiver 1302 may correspond to the transceiver module 1120 in FIG. 10 or the communication interface 1230 in FIG. 11. The transceiver 1302 may include a receiver (or referred to as a receiver machine or a receiver circuit) and a transmitter (or referred to as a transmitter machine or a transmitter circuit). The receiver is configured to receive a signal, and the transmitter is configured to transmit a signal.

Optionally, the terminal 1300 may further include a power supply 1305, configured to supply power to various components or circuits in the terminal 1300.

In addition, to make functions of the terminal device more perfect, the terminal device 1300 may further include one or more of an input unit 1306, a display unit 1307, an audio circuit 1308, a camera 1309, a sensor 1310, and the like. The audio circuit may further include a speaker 1308a, a microphone 1308b, and the like.

It should be understood that the terminal 1300 shown in FIG. 12 can implement each process related to the terminal in the method embodiment in FIG. 9. The operations and/or functions of the modules in the terminal 1300 are separately intended to implement corresponding procedures in the foregoing method embodiment. For details, refer to the descriptions in the foregoing method embodiment. To avoid repetition, detailed descriptions are properly omitted herein.

When the terminal device 1300 is configured to perform an operation procedure related to the terminal in the foregoing method embodiment, the processor 1301 may be configured to perform an action that is implemented inside the terminal and that is described in the foregoing method embodiment. The transceiver 1302 may be configured to perform an action of sending or receiving that is performed by the terminal to or from the network device and that is described in the foregoing method embodiment. For details, refer to the descriptions in the foregoing method embodiment. Details are not described herein.

Figure 13:
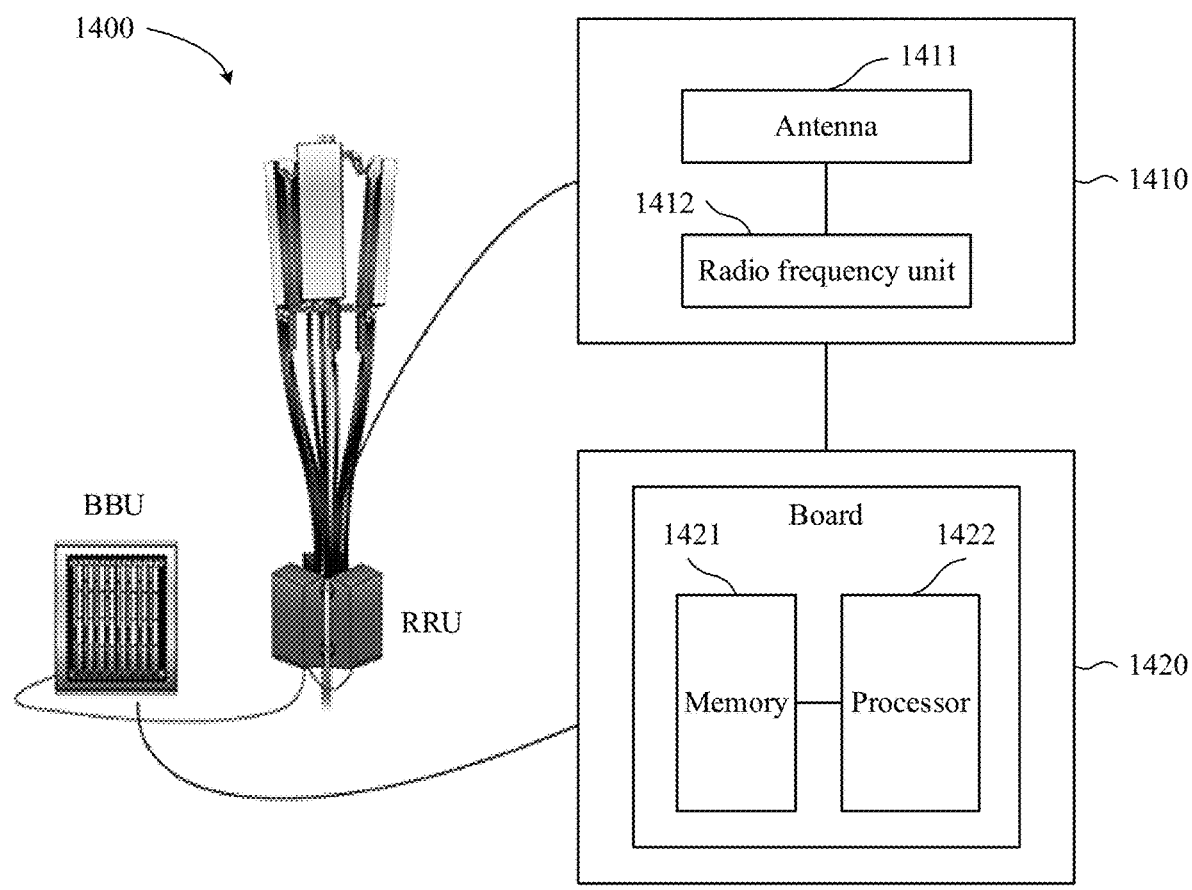
FIG. 13 is a schematic diagram of a structure of a base station according to an embodiment of this application.

FIG. 13 is a schematic diagram of a structure of a base station according to an embodiment of this application. The base station 1400 has the functions of the network device shown in FIG. 9. The base station 1400 may be applied to the communication system 100 shown in FIG. 1. As shown in FIG. 13, the base station 1400 may include one or more radio frequency units, for example, a remote radio unit (RRU) 1410, and one or more baseband units (BBU) (also referred to as a distributed unit (DU)) 1420. The RRU 1410 may be referred to as a transceiver unit, and may correspond to the transceiver module 1120 in FIG. 10 or the communication interface 1230 in FIG. 11. Optionally, the RRU 1410 may also be referred to as a transceiver machine, a transceiver circuit, a transceiver, or the like, and may include at least one antenna 1411 and a radio frequency unit 1412. Optionally, the RRU 1410 may include a receiving unit and a transmitting unit. The receiving unit may correspond to a receiver (also referred to as a receiver machine or a receiver circuit). The transmitting unit may correspond to a transmitter (also referred to as a transmitter machine or a transmitter circuit). The RRU 1410 is mainly used for reception/transmission of a radio frequency signal and conversion between a radio frequency signal and a baseband signal. For example, the RRU 1410 is configured to perform an operation procedure related to the network device in the foregoing method embodiment, for example, send the first information, the third information, or the fourth information to the terminal. The BBU 1420 is mainly configured to perform baseband processing, control the base station, and the like. The RRU 1410 and the BBU 1420 may be physically disposed together, or may be physically disposed separately, that is, in a distributed base station.

The BBU 1420 is a control center of the base station, may also be referred to as a processing unit, may correspond to the processing module 1110 in FIG. 10 or the processor 1210 in FIG. 11, and is mainly configured to perform baseband processing functions such as channel encoding, multiplexing, modulation, spectrum spreading, and the like. For example, the BBU (the processing unit) may be configured to control the base station to perform an operation procedure related to the network device in the foregoing method embodiment, for example, to generate the first information, the third information, or the fourth information. Alternatively, the BBU (the processing unit) may be configured to control the base station to perform the operation procedure related to the network device in the foregoing method embodiment.

In an example, the BBU 1420 may include one or more boards, and a plurality of boards may jointly support a radio access network (such as an LTE network) of a single access standard, or may separately support radio access networks (such as an LTE network, a 5G network, or another network) of different access standards. The BBU 1420 further includes a memory 1421 and a processor 1422. The memory 1421 is configured to store necessary instructions and data. The processor 1422 is configured to control the base station to perform a necessary action, for example, configured to control the base station to perform the operation procedure related to the network device in the foregoing method embodiment. The memory 1421 and the processor 1422 may serve the one or more boards. In other words, the memory and the processor may be disposed individually on each board. Alternatively, a plurality of boards may share a same memory and a same processor. In addition, a necessary circuit may further be disposed on each board.

It should be understood that the base station 1400 shown in FIG. 13 can implement each process related to the network device in the method embodiment shown in FIG. 9. The operations and/or functions of the modules in the base station 1400 are separately intended to implement corresponding procedures in the foregoing method embodiment. For details, refer to the descriptions in the foregoing method embodiment. To avoid repetition, detailed descriptions are properly omitted herein.

When the base station 1400 is configured to perform the operation procedure related to the network device in the foregoing method embodiment, the BBU 1420 may be configured to perform an action implemented inside the network device. The RRU 1410 may be configured to perform transmitting, receiving, and forwarding actions of the network device. For details, refer to the descriptions in the foregoing method embodiment. Details are not described herein.

It should be understood that the base station 1400 shown in FIG. 13 is merely a possible form of an access network device, and shall not constitute any limitation on this application. The method provided in this application is applicable to a network device in another form. For example, the network device in another form includes an active antenna unit (AAU), and may further include a central unit (central, CU) and/or a DU, or include a BBU and an adaptive radio unit (ARU), or a BBU. A specific form of the network device is not limited in this application.

This application further provides a chip system. The chip system includes at least one processor, configured to implement the functions related to the method performed by the network device and/or the terminal in the embodiment shown in FIG. 9, for example, to receive or process data and/or information related to the method.

In a possible design, the chip system further includes a memory, the memory is configured to store program instructions and data, and the memory is located inside or outside the processor.

The chip system may include a chip, or may include a chip and another discrete device.

This application further provides a communication system, including the access network device and the terminal.

This application further provides a computer-readable storage medium. The computer storage medium stores a computer program (also referred to as code or instructions). When the computer program is run by a processor, the method performed by the network device and/or the terminal in the embodiment shown in FIG. 9 is performed.

This application further provides a computer program product. The computer program product includes a computer program (also referred to as code or instructions). When the computer program is run, a computer is enabled to perform the method performed by the network device and/or the terminal in the embodiment shown in FIG. 9.

The processor in embodiments of this application may be an integrated circuit chip, and has a signal processing capability. In an implementation process, the steps in the method embodiment can be implemented by a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor, or the like. Steps of the methods disclosed with reference to embodiments of this application may be directly executed and accomplished through a hardware decoding processor, or may be executed and accomplished by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory. The processor reads information in the memory and completes the steps in the foregoing methods in combination with hardware of the processor.

A memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory in the system and the methods described in this specification is intended to include, but is not limited to, these memories and any memory of another proper type.

The terms such as "unit" and "module" used in this specification may indicate computer-related entities, hardware, firmware, combinations of hardware and software, software, or software being executed.

A person of ordinary skill in the art may be aware that various illustrative logical blocks (illustrative logical block) and steps described with reference to embodiments disclosed in this specification can be implemented by electronic hardware or a combination of computer software and electronic hardware. Whether the functions are performed by using hardware or software depends on particular applications and design constraints of the technical solutions. A person skilled in the art may use different methods to implement the described functions of each particular application, but it should not be considered that the implementation goes beyond the scope of this application. In the several embodiments provided in this application, it should be understood that the disclosed apparatus, device, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on actual requirements to achieve the objective of the solutions of embodiments.

In addition, functional units in embodiments of this application may be integrated into one processing unit, each of the units may exist alone physically, or two or more units may be integrated into one unit.

In the foregoing embodiments, all or a part of functions of functional units may be implemented by using software, hardware, firmware, or any combination thereof. When software is used to implement embodiments, all or a part of embodiments may be implemented in a form of a computer program product. The computer program product includes one or more computer instructions (programs). When the computer program instructions (programs) are loaded and executed on a computer, all or some of the procedures or functions according to embodiments of this application are generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk drive, or a magnetic tape), or an optical medium (for example, a digital video disc (DVD)), a semiconductor medium (for example, a solid-state drive (SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, wherein the method comprises:
   receiving first information from a network device;
   determining an evaluation mode of user experience based on the first information, wherein the evaluation mode of user experience is one of a plurality of evaluation modes of user experience, and the evaluation mode of user experience is used to evaluate an impact of network transmission on user experience; and
   sending second information to the network device, wherein the second information comprises information about the impact of the network transmission on user experience;
   wherein the evaluation mode of user experience is a formula mode, and a calculation formula for an extended reality quality index (XQI) for the evaluating the impact of the network transmission on user experience, is $XQI=XQI_1+XQI_2$,
   wherein $XQI_1$ represents an evaluation score of image quality experience, $$XQI_1 = 100 \times \left(1 - \alpha \times R_{ave} \times \frac{1}{FR}\right)$$

α represents a calculation coefficient, FR represents a frame rate of a video frame and is data amounts of video frames displayed per second, $R_{ave}$ represents a frame impairment rate in each group of pictures (GOP) and an average frame impairment rate of all GOPs in a statistical cycle, $R_{ave}=(N-i)/N$, N represents a size of the GOP, and i represents a position of a first frame that has a transmission error in the current GOP;
   wherein $XQI_2$ represents an evaluation score of interactive experience, $$XQI_2 = 100 \times \left(1 - \beta \times Q_{ave} \times \frac{1}{FR} \times f(T)\right)$$

β represents a calculation coefficient, FR represents a frame rate of a video frame and is data amounts of video frames displayed per second, $Q_{ave}$ represents an average frame skipping rate of all GOPs in the statistical cycle, $Q_{ave}=M/N$, M represents a quantity of skipped frames in the GOP, N represents a size of the GOP, T represents an N-dimensional vector, and elements of the vector represent delays caused by network transmission of video frames in the GOP; and
   wherein the second information comprises the XQI, such that the behavior of communication with the network device is adjusted based on the XQI.

2. The method according to claim 1, wherein the method further comprises:
   determining the impact of the network transmission on user experience based on the evaluation mode of user experience.

3. The method according to claim 1, wherein the method further comprises:
   determining a parameter of the evaluation mode of user experience based on the first information.

4. The method according to claim 3, wherein the method further comprises:
   determining the impact of the network transmission on user experience based on the evaluation mode of user experience and the parameter of the evaluation mode of user experience.

5. The method according to claim 1, wherein the evaluation mode of user experience comprises an evaluation mode of image quality experience and an evaluation mode of interactive experience, the evaluation mode of image quality experience is used to evaluate impact of a transmission error on image quality experience, and the evaluation mode of interactive experience is used to evaluate impact of a transmission delay on interactive experience.

6. The method according to claim 5, wherein the information about the impact of the network transmission on user experience comprises evaluation information of image quality experience and evaluation information of interactive experience; and
   the method further comprises:
   determining the evaluation information of image quality experience based on the evaluation mode of image quality experience; and
   determining the evaluation information of interactive experience based on the evaluation mode of interactive experience.

7. The method according to claim 5, wherein the information about the impact of the network transmission on user experience indicates an evaluation score of extended reality quality; and
   the method further comprises:
   determining the evaluation score of the extended reality quality based on the evaluation mode of image quality experience and the evaluation mode of interactive experience.

8. An apparatus, comprising:
   a non-transitory computer-readable memory comprising instructions; and
   one or more processors in communication with the memory and configured to execute the instructions, causing the apparatus to:
   receive first information from a network device;
   determine an evaluation mode of user experience based on the first information, wherein the evaluation mode of user experience is one of a plurality of evaluation modes of user experience, and the evaluation mode of user experience is used to evaluate an impact of network transmission on user experience; and send second information to the network device, wherein the second information comprises information about the impact of the network transmission on user experience;

wherein when the evaluation mode of user experience is a formula mode, a calculation formula for an extended reality quality index (XQI) for the evaluating the impact of the network transmission on user experience, is $XQI=XQI_1+XQI_2$, wherein $XQI_1$ represents an evaluation score of image quality experience, $$XQL_1 = 100 \times \left(1 - \alpha \times R_{ave} \times \frac{1}{FR}\right)$$

α represents a calculation coefficient, FR represents a frame rate of a video frame and is data amounts of video frames displayed per second, $R_{ave}$ represents a frame impairment rate in each group of pictures (GOP) and an average frame impairment rate of all GOPs in a statistical cycle, $R_{ave}=(N-i)/N$, N represents a size of the GOP, and i represents a position of a first frame that has a transmission error in the current GOP;

wherein $XQI_2$ represents an evaluation score of interactive experience, $$XQL = 100 \times \left(1 - \beta \times Q_{ave} \times \frac{1}{FR} \times f(T)\right)$$

β represents a calculation coefficient, FR represents a frame rate of a video frame and is data amounts of video frames displayed per second, $Q_{ave}$ represents an average frame skipping rate of all GOPs in the statistical cycle, $Q_{ave}=M/N$, M represents a quantity of skipped frames in the GOP, N represents a size of the GOP, T represents an N-dimensional vector, and elements of the vector represent delays caused by network transmission of video frames in the GOP; and wherein the second information comprises the XQI, such that the behavior of communication with the network device is adjusted based on the XQI.

9. The apparatus according to claim 8, wherein the apparatus is further caused to:
determine the impact of the network transmission on user experience based on the evaluation mode of user experience.

10. The apparatus according to claim 8, wherein the apparatus is further caused to:
determine a parameter of the evaluation mode of user experience based on the first information.

11. The apparatus according to claim 10, wherein the apparatus is further caused to:
determine the impact of the network transmission on user experience based on the evaluation mode of user experience and the parameter of the evaluation mode of user experience.

12. The apparatus according to claim 8, wherein the evaluation mode of user experience comprises an evaluation mode of image quality experience and an evaluation mode of interactive experience, the evaluation mode of image quality experience is used to evaluate impact of a transmission error on image quality experience, and the evaluation mode of interactive experience is used to evaluate impact of a transmission delay on interactive experience.

13. The apparatus according to claim 12, wherein the information about the impact of the network transmission on user experience comprises evaluation information of image quality experience and evaluation information of interactive experience; and
wherein the apparatus is further caused to:
determine the evaluation information of image quality experience based on the evaluation mode of image quality experience; and
determine the evaluation information of interactive experience based on the evaluation mode of interactive experience.

14. The apparatus according to claim 12, wherein the information about the impact of the network transmission on user experience indicates an evaluation score of extended reality quality; and
wherein the apparatus is further caused to:
determine the evaluation score of the extended reality quality based on the evaluation mode of image quality experience and the evaluation mode of interactive experience.

15. A non-transitory computer readable medium storing instructions that are executable by a computer, such that when the instructions are executed by a first communication apparatus, such that the first communication apparatus is caused to perform:
receiving first information from a network device;
determining an evaluation mode of user experience based on the first information, wherein the evaluation mode of user experience is one of a plurality of evaluation modes of user experience, and the evaluation mode of user experience is used to evaluate an impact of network transmission on user experience; and
sending second information to the network device, wherein the second information comprises information about the impact of the network transmission on user experience;
wherein when the evaluation mode of user experience is a formula mode, a calculation formula for an extended reality quality index (XQI) for the evaluating the impact of the network transmission on user experience, is $XQI=XQI_1+XQI_2$,
wherein $XQI_1$ represents an evaluation score of image quality experience, $$XQL_1 = 100 \times \left(1 - \alpha \times R_{ave} \times \frac{1}{FR}\right)$$

α represents a calculation coefficient, FR represents a frame rate of a video frame and is data amounts of video frames displayed per second, $R_{ave}$ represents a frame impairment rate in each group of pictures (GOP) and an average frame impairment rate of all GOPs in a statistical cycle, $R_{ave}=(N-i)/N$, N represents a size of the GOP, and i represents a position of a first frame that has a transmission error in the current GOP;
wherein $XQI_2$ represents an evaluation score of interactive experience, $$XQL = 100 \times \left(1 - \beta \times Q_{ave} \times \frac{1}{FR} \times f(T)\right)$$

β represents a calculation coefficient, FR represents a frame rate of a video frame and is data amounts of video frames displayed per second, $Q_{ave}$ represents an average frame skipping rate of all GOPs in the statistical cycle, $Q_{ave}$=M/N, M represents a quantity of skipped frames in the GOP, N represents a size of the GOP, T represents an N-dimensional vector, and elements of the vector represent delays caused by network transmission of video frames in the GOP; and wherein the second information comprises the XQI, such that the behavior of communication with the network device is adjusted based on the XQI.

16. The non-transitory computer readable medium according to claim 15, wherein the execution of the instructions further cause the first communication apparatus to perform:
  determining the impact of the network transmission on user experience based on the evaluation mode of user experience.

17. The non-transitory computer readable medium according to claim 15, wherein the execution of the instructions further cause the first communication apparatus to perform:
  determining a parameter of the evaluation mode of user experience based on the first information.

18. The non-transitory computer readable medium according to claim 17, wherein the execution of the instructions further cause the first communication apparatus to perform:
  determining the impact of the network transmission on user experience based on the evaluation mode of user experience and the parameter of the evaluation mode of user experience.

19. The non-transitory computer readable medium according to claim 15, wherein the evaluation mode of user experience comprises an evaluation mode of image quality experience and an evaluation mode of interactive experience, the evaluation mode of image quality experience is used to evaluate impact of a transmission error on image quality experience, and the evaluation mode of interactive experience is used to evaluate impact of a transmission delay on interactive experience.

20. The non-transitory computer readable medium according to claim 19, wherein the information about the impact of the network transmission on user experience comprises evaluation information of image quality experience and evaluation information of interactive experience; and
  wherein the execution of the instructions further cause the first communication apparatus to perform:
  determining the evaluation information of image quality experience based on the evaluation mode of image quality experience; and
  determining the evaluation information of interactive experience based on the evaluation mode of interactive experience.

* * * * *